US008292728B2

(12) United States Patent
Goto et al.

(10) Patent No.: US 8,292,728 B2
(45) Date of Patent: Oct. 23, 2012

(54) GAME SYSTEM, AND GAME APPARATUS AND TOTAL PERFORMANCE PROCESSING APPARATUS CONSTITUTING THE GAME SYSTEM

(75) Inventors: Nobuhiro Goto, Kanagawa (JP); Kazuhiro Kusuda, Kanagawa (JP); Masato Okuaki, Kanagawa (JP); Takashi Uchiyama, Kanagawa (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 253 days.

(21) Appl. No.: 12/677,832

(22) PCT Filed: Sep. 2, 2008

(86) PCT No.: PCT/JP2008/065721
§ 371 (c)(1),
(2), (4) Date: Mar. 12, 2010

(87) PCT Pub. No.: WO2009/034873

PCT Pub. Date: Mar. 19, 2009

(65) Prior Publication Data

US 2010/0210335 A1 Aug. 19, 2010

(30) Foreign Application Priority Data

Sep. 14, 2007 (JP) ................................ 2007-240227

(51) Int. Cl.
*A63F 9/24* (2006.01)
*A63F 13/00* (2006.01)
*A63F 13/12* (2006.01)

(52) U.S. Cl. ................ 463/23; 463/21; 463/26; 463/27; 463/28; 273/138.1; 273/139; 379/93.13; 705/14.12

(58) Field of Classification Search .............. 463/10–13, 463/17–19, 21–23, 25–29; 273/138.1, 139, 273/142 B, 142 A, 142 J, 269, 304; 283/903; 379/93.13; 705/14.12, 14.38, 14.6, 14.65, 705/16–17, 39, 44; *A63F 9/24, 13/00, 13/12; G06F 17/00, 19/00; G07C 13/00, 15/00*
See application file for complete search history.

(56) References Cited

U.S. PATENT DOCUMENTS 6,283,856 B1 * 9/2001 Mothwurf ....................... 463/17

(Continued)

FOREIGN PATENT DOCUMENTS

JP 2004-298414 A 10/2004

(Continued)

OTHER PUBLICATIONS

International Search Report for corresponding International Patent Application No. PCT/2008/065721, dated Nov. 4, 2008.
Japanese Office Action for corresponding Japanese Patent Application No. 2007-240227, dated Apr. 17, 2009.

(Continued)

*Primary Examiner* — Arthur O. Hall

(57) ABSTRACT

The present invention is to be capable of carrying out an unusual performance beyond type of machine.

The present game apparatus includes: two or more types of game apparatuses having hardware configurations different from each other, each of the game apparatuses including a performance unit for carrying out a performance visually and audibly appealing to a player, and a game progress control unit for controlling game progress and performing game performance control according to the game progress by controlling the performance unit; and a total performance processing apparatus for executing a process for carrying out a total performance in the two or more types of game apparatuses by using the performance unit provided in each of the two or more types of game apparatuses. The total performance processing apparatus and the two or more types of game apparatuses are connected and capable of communicating with each other. The total performance processing apparatus includes a control command transmitting unit for transmitting a total performance control command for carrying out the total performance at a predetermined total performance timing to each of the two or more types of game apparatuses. Each of the two or more types of game apparatuses includes a total performance control unit for controlling the performance unit according to the total performance control command from the total performance processing apparatus and executing total performance control for carrying out a performance assuming part of the total performance at the predetermined total performance timing.

12 Claims, 17 Drawing Sheets

U.S. PATENT DOCUMENTS

| | | | | |
|---|---|---|---|---|
| 7,278,913 | B2 * | 10/2007 | Ohyagi et al. | 463/6 |
| 7,314,411 | B2 * | 1/2008 | Lannert et al. | 463/19 |
| 7,871,326 | B2 * | 1/2011 | Wright et al. | 463/25 |
| 2002/0103022 | A1 * | 8/2002 | Somol et al. | 463/25 |
| 2007/0026935 | A1 * | 2/2007 | Wolf et al. | 463/25 |
| 2007/0026943 | A1 * | 2/2007 | Yoshimura | 463/29 |
| 2007/0078005 | A1 * | 4/2007 | Shiraiwa | 463/43 |
| 2007/0243936 | A1 * | 10/2007 | Binenstock et al. | 463/42 |
| 2010/0222131 | A1 | 9/2010 | Goto et al. | |

FOREIGN PATENT DOCUMENTS

| | | | |
|---|---|---|---|
| JP | 2005-103150 | A | 4/2005 |
| JP | 2005-237889 | A | 9/2005 |
| JP | 2006-026010 | A | 2/2006 |
| JP | 2007-97838 | A | 4/2007 |
| JP | 2007-215778 | A | 8/2007 |
| TW | 2007-24210 | A | 7/2007 |

OTHER PUBLICATIONS

Japanese Office Action for corresponding Japanese Patent Application No. 2007-240227, dated Oct. 31, 2008.

Taiwanese Office Action for corresponding Taiwanese Patent Application No. 097134873, dated Oct. 26, 2011.

Taiwanese Search Report for corresponding Taiwanese Patent Application No. 097134873, dated Oct. 30, 2011.

Written Opinion for corresponding International Patent Application No. PCT/JP2008/065721, dated Nov. 4, 2008.

Japanese Office Action for corresponding Japanese Patent Application No. 2007-240227, dated Apr. 17, 2009, pp. 1-3.

Japanese Office Action for corresponding Japanese Patent Application No. 2007-240227, dated Oct. 31, 2008, pp. 1-4.

Taiwanese Office Action for corresponding Taiwanese Patent Application No. 097134873, dated Oct. 26, 2011, pp. 1-6.

Taiwanese Search Report for corresponding Taiwanese Patent Application No. 097134873, dated Oct. 30, 2011, pp. 1-1.

* cited by examiner

FIG. 16
WIDE AREA
PROGRESSIVE
JACKPOT CHANCE

GAME SYSTEM, AND GAME APPARATUS AND TOTAL PERFORMANCE PROCESSING APPARATUS CONSTITUTING THE GAME SYSTEM

TECHNICAL FIELD

The present invention relates to: a game system provided with a plurality of types of game apparatuses having hardware configurations different from each other, each of which game apparatuses includes a performance unit for carrying out a performance appealing visually or audibly to a player and a total performance processing apparatus connected to each game apparatus so as to be capable of communicating with the game apparatus; and a game apparatus and a total performance processing constituting the game system.

BACKGROUND ART

Conventionally, in an individual game apparatus, various performances are carried out by means of light emitted from a lamp, etc., image displayed on a display, audio, etc., for the purpose of giving a player a sense of an uplifting feeling, building a way of viewing a game world, and attracting the interest of an audience, etc., other than a player.

Patent Document 1 discloses a game machine provided with a plurality of stations, in which a performance for a show time can be carried out across each of the stations all together. According to this game machine, when carrying out the performance for a show time, a higher performance impact can be expected as compared to a case where each station independently carries out an individual performance.

Patent Document 1: Japanese Published Unexamined Patent Application No. 2007-215778

DISCLOSURE OF THE INVENTION

Problems to be Solved by the Invention

However, in each station, the outer appearance and the internal structure are all configured by using the same hardware, and thus, the player or the audience, etc., recognizes each station as a game apparatus of the same type of machine. As a result, even when each station is in cooperation with each other to carry out one total performance, the total performance is not better than the individual performance carried out by that type of machine. Therefore, it is not possible to carry out an unusual performance beyond the type of machine.

The present invention realizes and provides a game system capable of carrying out unusual performance beyond a certain type of machine, and a game apparatus and a total performance processing apparatus constituting the game system.

Means for Solving the Problem

As an aspect of the present invention, it is listed that a game system includes: two or more types of game apparatuses having hardware configurations different from each other, each of the game apparatuses including a performance unit for carrying out a performance visually and audibly appealing to a player, and a game progress control unit for controlling game progress and performing game performance control according to the game progress by controlling the performance unit; and a total performance processing apparatus for executing a process for carrying out a total performance in the two or more types of game apparatuses by using the performance unit provided in each of the two or more types of game apparatuses, wherein the total performance processing apparatus and the two or more types of game apparatuses are connected and capable of communicating with each other, the total performance processing apparatus includes a control command transmitting unit for transmitting a total performance control command for carrying out the total performance at a predetermined total performance timing to each of the two or more types of game apparatuses, and each of the two or more types of game apparatuses includes a total performance control unit for controlling the performance unit according to the total performance control command from the total performance processing apparatus and executing total performance control for carrying out a performance assuming part of the total performance at the predetermined total performance timing.

In this game system, when two or more types of game apparatuses (games apparatuses of different types) having hardware configurations different from each other cause performance units used for performance respective games to carry out a performance assuming part of a total performance, it is possible to carry out a total performance in which all the game apparatuses are in cooperation with each other.

In the above-described game system, the two or more types of game apparatuses may have hardware configurations constituting the performance unit different from each other.

In this game system, wider performance variations, as well as a higher performance impact, can be expected as compared to a case where two or more game apparatuses having the same hardware configurations constituting the performance unit carry out the total performance.

In the above-described game system, the game system may include a jackpot drawing apparatus connected to and capable of communicating with the total performance processing apparatus and the two or more types of game apparatuses, wherein the jackpot drawing apparatus may include: a drawing unit for drawing to determine whether a player who plays with the two or more types of game apparatuses wins a jackpot award or loses a game in which the player does not win the jackpot award; a storage unit for storing payout amount data indicating a payout target amount to be paid out to the winning player when the drawing unit determines the winning of the jackpot award; a payout processing unit for performing a payout process for reading out the payout amount data from the storage unit when the drawing unit determines the winning of the jackpot award, and executing a payout process for paying out a payout target of an amount indicated by the read-out payout amount data to the winning player; a payout amount increasing unit for accumulatively increasing the amount indicated by the payout amount data stored in the storage unit when a predetermined payout amount increasing condition is satisfied; and a winning information transmitting unit for transmitting winning information indicating the winning to the total performance processing apparatus when the drawing unit determines the winning of the jackpot award, and wherein the control command transmitting unit of the total performance processing apparatus may transmit the total performance control command to each of the two or more types of game apparatuses when the winning information is received.

In this game system, a winning performance carried out when a so-called jackpot drawing is won can be carried out as a total performance in which game apparatuses of different types are in cooperation. The winning performance for the conventional jackpot drawing has been carried out by using only a game apparatus played by the winning player; according to the present game system, however, the winning performance (total performance) is to be carried out by all the game apparatuses (including a game apparatus played by a player who has lost a jackpot drawing) constituting the system. This enables an impressive, effective winning performance.

In the above-described game system, the game progress control unit provided in each of the two or more types of game apparatuses may not perform the game performance control during the total performance control by the total performance control unit or perform the game performance control in which the performance is carried out in moderation.

In the present game system, the total performance using the performance unit in each game apparatus is carried out in preference over an individual performance of each game apparatus. Thereby, it becomes possible to carry out an appropriate total performance even if a predetermined total performance timing at which the total performance is carried out overlaps a timing at which the individual performance of some game apparatuses is carried out.

In the above-described game system, each of the two or more types of game apparatuses may include a timing anticipation processing unit for performing a process of anticipating a timing at which game progress at each of the game apparatuses themselves is changed to a previously set situation where the total performance can be carried out, and transmitting total performance enabling timing information indicating the anticipated timing to the total performance processing apparatus, and the total performance processing apparatus may include a total performance timing determining unit for determining the predetermined total performance timing based on the total performance enabling timing information transmitted from the two or more types of game apparatuses.

It is desired that the total performance does not impede game progress on each game apparatus. The reason for that is that when a player who plays each game apparatus concentrates on a game, if a total performance different from that of his or her game is carried out at the game apparatus of the player, the player's concentration on the game is disrupted, probably resulting in a decrease in the enjoyment of the game.

In each of the game apparatuses, generally, there is a game progress situation suitable for carrying out the total performance that would not impede each game progress, and as such situation, there is a game progress situation capable of anticipating the timing at which the suitable game progress situation arises. Therefore, by previously determining and setting the game progress situation suitable for carrying out the total performance that would not impede the game progress, each game apparatus becomes capable of anticipating a timing at which a game progress situation at each game apparatus becomes the suitable situation.

Therefore, in this game system, the total performance processing apparatus is caused to comprehend the timing at which the game progress situation of each game apparatus becomes a situation where the total performance can be carried out, and the total performance timing at which the total performance is carried out is determined. Thereby, it becomes possible to control so that the total performance is carried out at a timing at which the game progress of each game apparatus is not impeded as much as possible. Accordingly, it is possible to prevent the development of a case where the concentration of a player who concentrates on the game is disrupted so that the enjoyment of the game is decreased.

In the above-described game system, the total performance processing apparatus may include a performance timing determining unit for determining the predetermined total performance timing according to a predetermined total performance timing determining condition, the control command transmitting unit of the total performance processing apparatus may transmit the total performance control command for carrying out the total performance at the predetermined total performance timing determined by the performance timing determining unit to each of the two or more types of game apparatuses, and the game progress control unit provided in each of the two or more types of game apparatuses may perform game progress control so that the game progress situation at each of the game apparatuses themselves is changed to a previously set situation in which the total performance can be carried out, at the predetermined total performance timing according to the total performance control command from the total performance processing apparatus.

In this game system, when a total performance timing determined by the total performance processing apparatus arrives, the game progress of each game apparatus is controlled so that the game progress situation of each game apparatus becomes a situation suitable for carrying out the total performance. Therefore, it is possible to carry out the total performance without attempting to impede the game progress of each game apparatus. Thus, it is possible to prevent the development of a case where the concentration of a player who concentrates on the game is disrupted so that the enjoyment of the game is decreased.

It is noted that, in each game apparatus, generally, there is a game progress situation suitable for carrying out the total performance that would not impede the game progress of each game apparatus, and as such situation, there is a game progress situation capable of controlling the timing at which such a situation is reached. Therefore, by previously determining and setting the game progress situation suitable for carrying out the total performance that would not impede the game progress, each game apparatus becomes capable of turning the game progress situation at each game machine into such a suitable situation at the total performance timing determined by the total performance processing apparatus.

As another aspect of the present invention, it is listed that a game apparatus includes: a performance unit for carrying out a performance visually or audibly appealing to a player; and a game progress control unit for performing game performance control according to game progress by controlling the game progress and controlling the performance unit, wherein the game apparatus is connected to and capable of communicating with a total performance processing apparatus for transmitting to each of the two or more types of game apparatuses a total performance control command for carrying out a single total performance in all game apparatuses by using the performance unit provided in each of the two or more types of game apparatuses having different hardware configurations from each other, and the game apparatus further includes a total performance control unit for performing total performance control for carrying out a performance assuming part of the total performance at the predetermined total performance timing by controlling the performance unit according to the total performance control command when the total performance control command is received from the total performance processing apparatus.

In this game apparatus, by working together with the above-described total performance processing apparatus, it is possible to carry out a single total performance that is cooperated with a game apparatus of a different type of machine.

As yet another aspect of the present invention, it is listed that a total performance processing apparatus connected to and capable of communicating with two or more types of game apparatuses having hardware configurations different from each other; which performs a process for carrying out a single total performance at all the game apparatuses by using each of performance units, provided in each of the two or more types of game apparatuses, for carrying out a performance visually or audibly appealing to a player; and includes a control command transmitting unit for transmitting a total performance control command for carrying out the total performance by causing the performance unit in each of the two or more types of game apparatuses to carry out a performance assuming part of the total performance at a predetermined total performance timing, to each of the two or more types of game apparatuses.

In this total performance processing apparatus, by working together with two or more types of game apparatuses having hardware configurations different from each other, it is possible to carry out a single total performance in which these game apparatuses are cooperated with each other.

Effect of the Invention

According to the present invention, since game apparatuses of different types are cooperated to carry out a single total performance, it is possible to carry out an unusual performance beyond the type of machine.

DESCRIPTION OF REFERENCE NUMERALS

1000 Horse-racing game machine (token-operated game machine)
1010 Station
1011 Display (display unit)
1101 Main control device
1108, 2625, 3107, 4003, 5003 External communication device
1201 Station control device
2000 Pusher game machine (token-operated game machine)
2001 Satellite drawing apparatus
2002 Center drawing apparatus
2500 Play field
2601, 2611, 2621 Control device
2700 Display unit
3000 Slot machine (token-operated game machine)
3011 Performance panel (display unit)
3101 Control device
4000 Management server
4001 Control device
5000 Gaming arcade server
5001 Control device

BEST MODE FOR CARRYING OUT THE INVENTION

The following description will explain one embodiment applied to a game system configured with three types of token-operated game machines as arcade game machines (business-use game apparatuses) that are two or more types of game apparatuses having hardware configurations different from each other, and a gaming arcade server and a management server that are total performance processing apparatuses connected to and capable of communicating with these token-operated game machines.

[System Overview]

First, the configuration of a whole game system according to the present embodiment will be explained.

Figure 1:
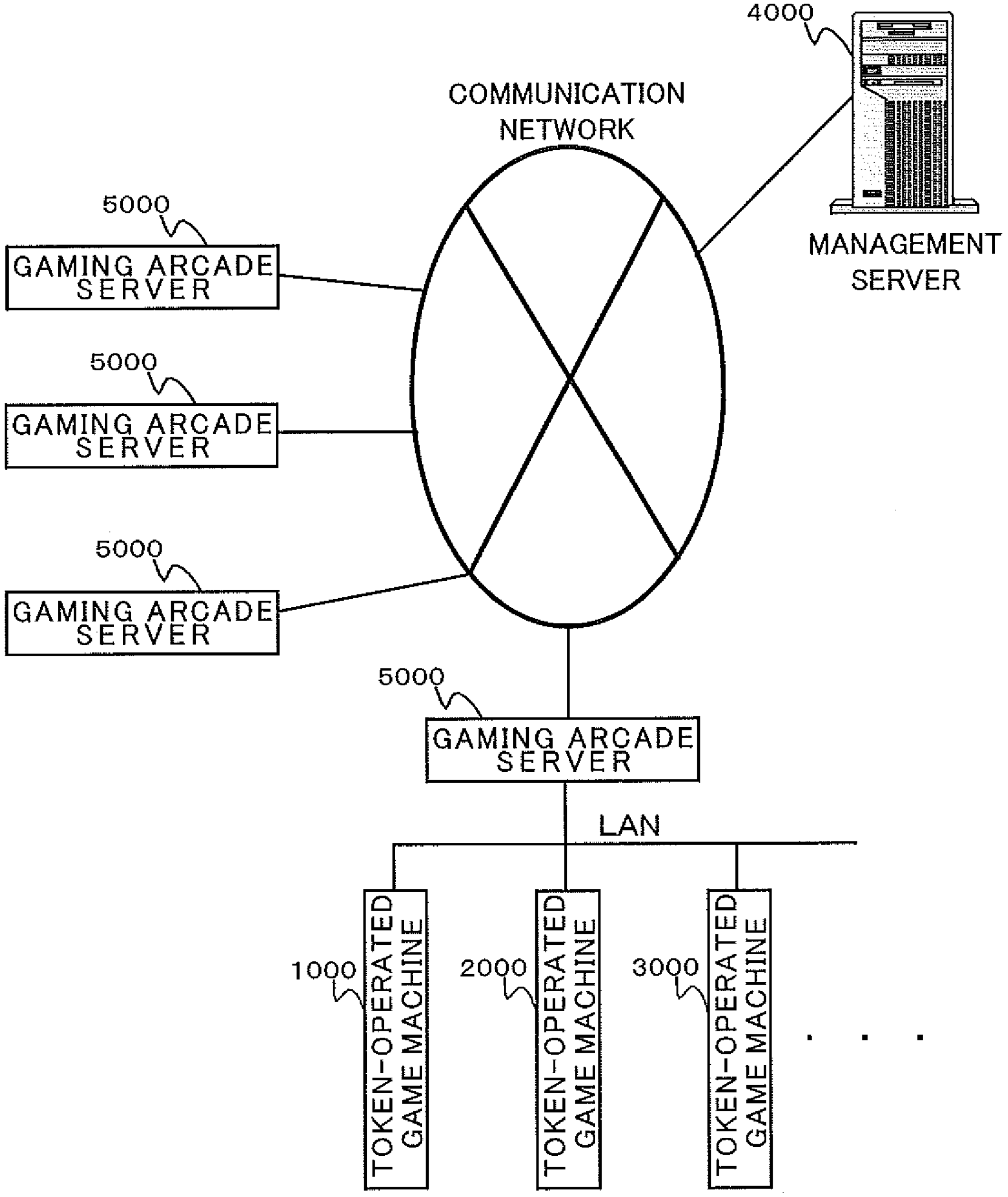
FIG. 1 is a schematic configuration diagram of a whole game system according to an embodiment.

FIG. 1 is a schematic configuration diagram of the whole game system according to the present embodiment.

Three types of token-operated game machines 1000, 2000, and 3000 constituting the game system are different types of game machines having hardware configurations different from each other. In the present embodiment, the token-operated game machines 1000, 2000, and 3000 are installed in a game facility such as a game center, etc., and connected to a gaming arcade server 5000 in the gaming arcade via a LAN (Local Area Network) that is a high-speed communication network. A management server 4000 is connected to the gaming arcade server in each gaming arcade, via a WAN (Wide Area Network) that is a low-speed communication network. The management server 4000 performs data communication with the gaming arcade server that performs system management for the whole gaming arcade by performing data communication with each of the token-operated game machines 1000, 2000, and 3000 so as to manage the whole game system. It is noted that a game system covering a plurality of gaming arcades will be explained in the present embodiment; the explanation, however, will be applied also to a game system within a single gaming arcade.

Next, the configuration and the operation of each of the token-operated game machines 1000, 2000, and 3000 will be explained.

[Horse-Racing Game Machine 1000]

The token-operated game machine 1000 is a horse-racing game machine.

In the horse-racing game machine 1000, one or at least two players predict an order of arrival for a horse race played in the horse-racing game machine, and when the prediction is correct, the player is capable of receiving a token payout according to odds against that order.

Figure 2:
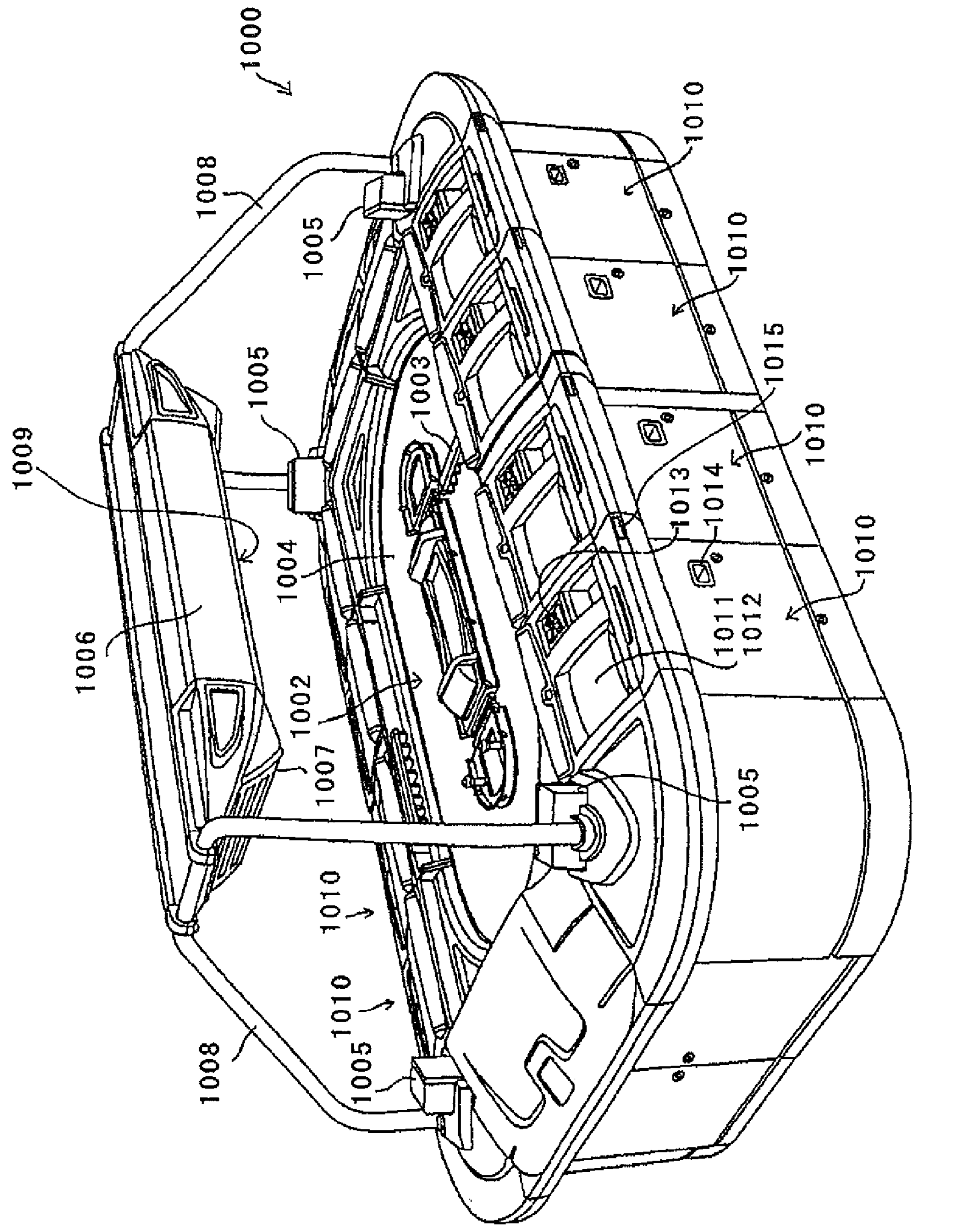
FIG. 2 is an outline view showing one example of a horse-racing game machine constituting the same game system.

FIG. 2 is an outline view showing one example of the horse-racing game machine 1000.

The horse-racing game machine 1000 is provided with a field unit 1002 arranged at the center portion and a plurality of stations 1010 arranged to surround the field unit 1002. In the field unit 1002, a field surface 1004 as a moving surface that resembles turf on a race track on which a starting gate 1003 as a model is installed, is arranged, and when a plurality of model horses (not shown) are moved within the field surface 1004, a race is developed. Around the field unit 1002, a plurality of speakers 1005 for providing live race coverage, cheers, etc., are placed. Above the field unit 1002, placed are: a display unit 1006 for displaying, for example, a total accumulated token count indicating the number of pieces to be paid out for a total jackpot drawing described later; an illuminating device 1007 for illuminating the field unit 1002; and a camera 1009 that is an imaging unit functioning as imaging means for imaging the field unit 1002. The display unit 1006, the illuminating device 1007, and the camera 1009 are supported by a support column 1008. The speaker 1005 and the illuminating device 1007 that are performance units functioning as performance means of the horse-racing game machine 1000.

In the station 1010, a display 1011 for displaying thereon a game screen according to the progress of the game, and a touch panel 1012 overlapped on a display surface of the display 1011, are arranged. When a player touches a predetermined position of the game screen displayed on the display 1011 according to an instruction on the game screen, the position is detected by the touch panel 1012 and an operation content of the player is recognized by the horse-racing game machine 1000. In the station 1010, further arranged are: a token drop-in unit 1013 into which a token is dropped in by the player; a token payout opening 1014 from which the token is paid out to the player; and a magnetic-card inserting slot 1015 into which a magnetic card for recording thereon data that becomes necessary when the game is resumed is inserted.

In the horse-racing game machine 1000, races having the same titles as those of actual horse races held by the Japan Racing Association are sequentially held according to a predetermined cycle. For races held during one year, about 60 races are prepared, and for each race, a time for betting a token, i.e., a time for purchasing a betting ticket; a time during which a race is held by model horses; and a time for displaying race results are secured. The player predicts the order of arrival for each race, and is capable of freely purchasing a betting ticket. The purchasing of the betting ticket is performed by betting a token, and when the purchased betting ticket matches the results of the race, the player is paid out, as a dividend, tokens of which the number of pieces corresponds to that obtained in accordance with the number of pieces of tokens to be bet and odds.

In the horse-racing game machine 1000 in the present embodiment, the field unit 1002 forms the field surface 1004, and on the field surface 1004, an artificial lawn resembling an actual turf and models such as a starting gate 1003, etc., are arranged. A model horse as a moving body is moved on the field surface 1004.

Figure 3:
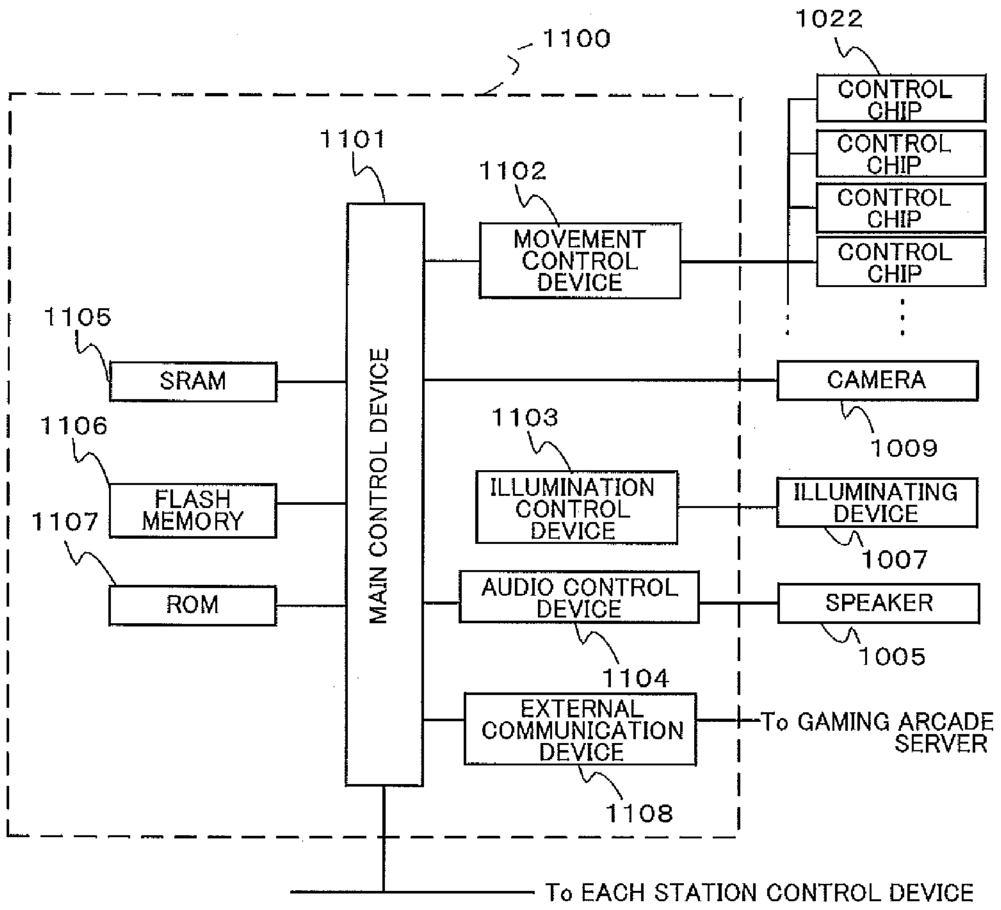
FIG. 3 is a control block diagram showing a main control unit for controlling a whole operation of the same horse-racing game machine in an integrated way.

FIG. 3 is a control block diagram showing a main control unit for controlling the whole operation of the horse-racing game machine 1000 in an integrated way.

Figure 4:
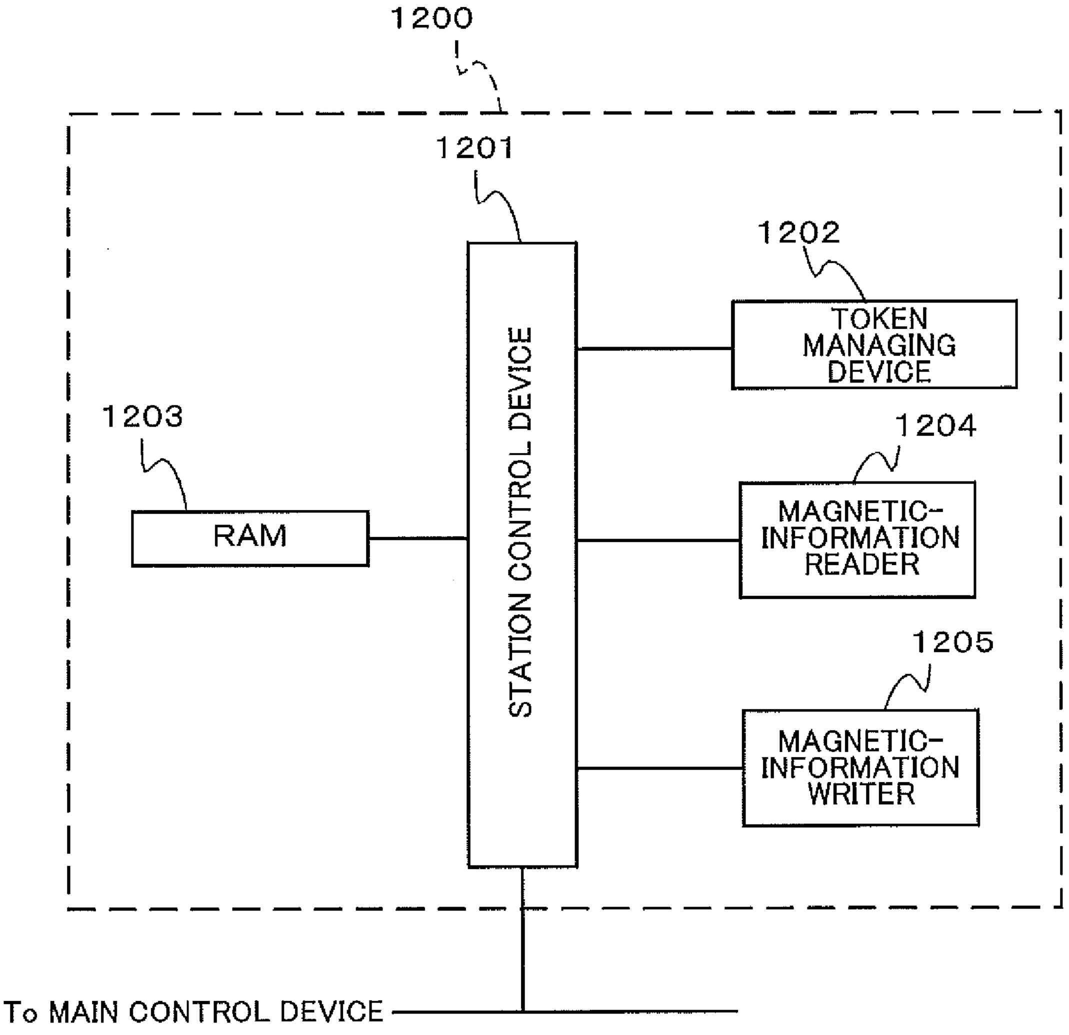
FIG. 4 is a control block diagram showing a station control unit arranged in each station of the same horse-racing game machine.

FIG. 4 is a control block diagram showing a station control unit arranged in each station 1010.

As shown in FIG. 3, the main control unit 1100 placed on the field unit side is provided with: a main control device 1101; a movement control device 1102 for controlling a movement of the model horse in the field unit 1002; an illumination control device 1103 for controlling the illuminating device 1007; an audio control device 1104 for controlling the cheers, the live coverage, etc., provided by the speaker 1005; an SRAM 1105 and a flash memory 1106 for temporarily recording data processed by the main control device 1101; a ROM 1107 in which a program necessary for the game and various types of databases are stored; and an external communication device 1108 for performing data communication via a LAN with an external device such as the gaming arcade server 5000. The main control device 1101 is connected to each of the movement control device 1102, the illumination control device 1103, the audio control device 1104, the SRAM 1105, the flash memory 1106, the ROM 1107, the external communication device 1108, and the camera 1009. In the ROM 1107, a movement control program that is movement control information for each model horse, various types of data relating to each horse used for the race, a database for a race schedule, etc., are stored.

As shown in FIG. 4, the station control unit 1200 arranged in each station 1010 is provided with: a station control device 1201; a token managing device 1202 for managing a payout of the token and any other similar task; a RAM 1203 for temporarily recording various types of data of the player; a magnetic-information reader 1204 for reading the magnetic information of the magnetic card inserted into the magnetic-card inserting slot 1015; and a magnetic-information writer 1205 for writing various types of information such as an ID code into the magnetic card. The station control device 1201 is connected to each of the token managing device 1202, the RAM 1203, the magnetic-information reader 1204, and the magnetic-information writer 1205. The station control device 1201 is also connected to each of units such as: the display 1011 and the touch panel 1012 (shown in FIG. 2) arranged in the station 1010; a token drop-in sensor (not shown) for detecting the token dropped in via the token drop-in unit 1013; and a magnetic-card driving device (not shown) for driving the magnetic card inserted into the magnetic-card inserting slot 1015.

Furthermore, as shown in FIG. 3 and FIG. 4, the station control device 1201 of each station 1010 is connected to the main control device 1101 on the game machine main body side, enabling data communication necessary between these components.

The main control device 1101 of the main control unit 1100, in order to realistically reproduce an actual horse race when holding a race, changes a movement control content of each model horse for each race according to various types of data such as a parameter of each horse. Then, the movement control content is determined before the start of a race, and the movement of the model horse is controlled according to the resultant movement control content. Concretely, before the start of a race, the main control device 1101 of the main control unit 1100 reads out various types of parameters of horses competing in the current race and data such as turf condition, from the ROM 1107, so as to determine the order of arrival for the current race. It is noted that only a first place horse and a second place horse affect the payout of the token to the player, and thus, it is not necessary to determine the orders of all the horses competing in that race and it suffices to determine at least the first place horse and the second place horse. In this case, the movement of the other horses is controlled according to the various types of parameters so that the other horses do not arrive at the finish line first or second. Order of arrival data, the parameter of each horse, etc., determined by the main control device 1101 are forwarded to the movement control device 1102.

The movement control device 1102 that receives the data from the main control device 1101 executes the movement control program recorded in a ROM (not shown) so as to perform movement control on each horse. The movement control device 1102 executing the movement control program calculates a moving pattern of each horse from the parameter, etc., of each horse, and transmits a control command to each control chip 1022 so that each model horse 1060 is moved according to the resultant moving pattern. Concretely, in order to generate a magnetic field allowing each model horse 1060 to move according to the moving pattern of each horse, a control command is transmitted to the control chip of each magnetic field generation-use circuit board. Each control chip 1022 that receives the control command controls a current that passes through each coil so that a magnetic force that pulls a south pole of a permanent magnet of each model horse 1060 along a planned moving route of each model horse 1060 is sequentially generated. Thereby, each model horse 1060 can be moved along the planned moving route. As a result, each model horse 1060 of which the movement is controlled by the movement control device 1102 develops the race in the play field.

[Pusher Game Machine 2000]

Next, the token-operated game machine 2000 will be explained.

The token-operated game machine 2000 is a pusher game machine.

Figure 5:
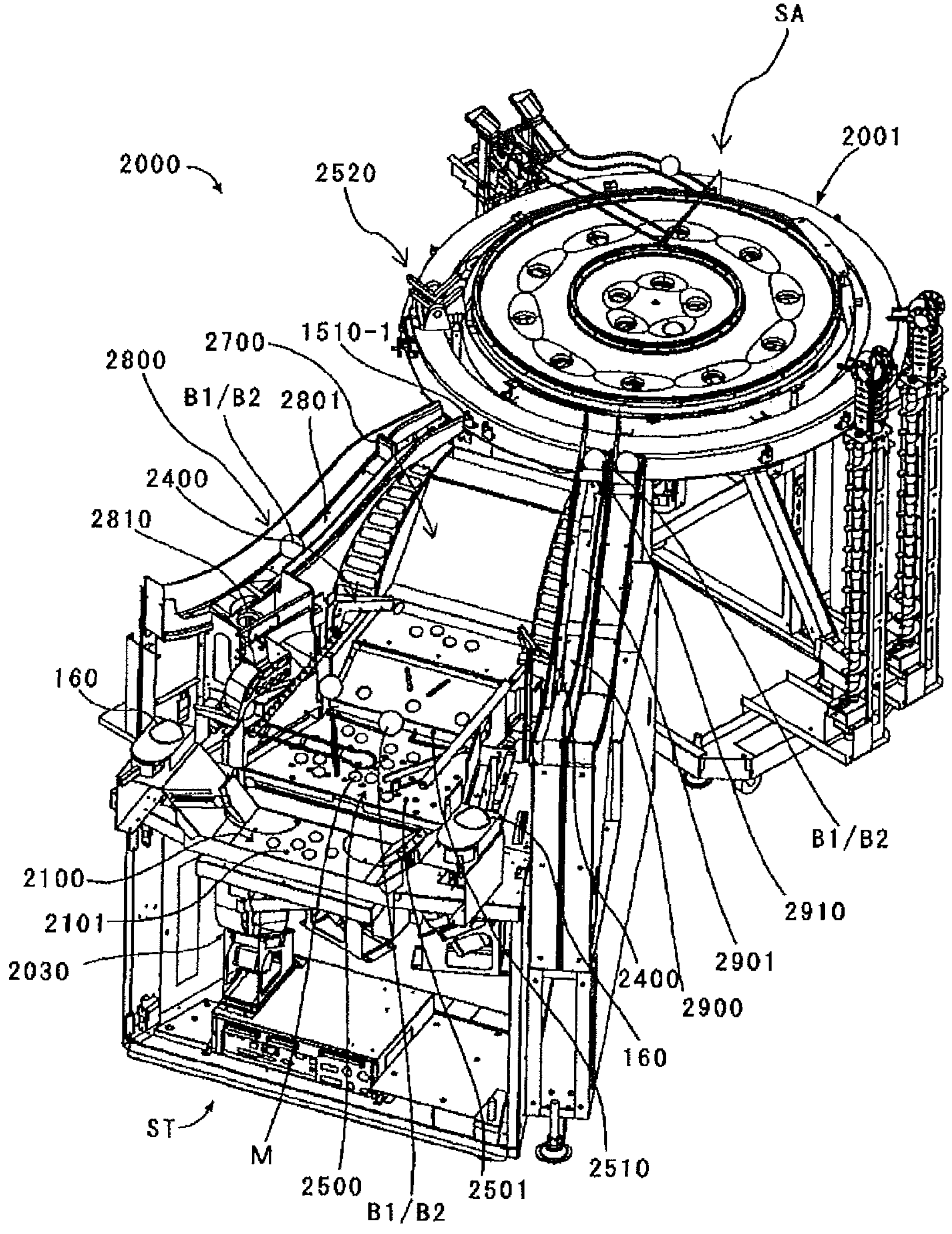
FIG. 5 is an explanatory view for explaining the configuration of a station unit in a pusher game machine constituting the same game system.

FIG. 5 is an explanatory view for explaining the configuration of a station unit ST in the pusher game machine 2000.

In the pusher game machine 2000, four satellite units SA are arranged to surround a center drawing apparatus (not shown). Each satellite unit SA is provided with the four station units ST, and each player is to individually play a game at each station unit ST. Moreover, each satellite unit SA is provided with one satellite drawing apparatus 2001, and around the satellite drawing apparatus 2001, each station unit ST is lined and placed.

The station unit ST is configured mainly by: a token drop-in mechanism (drop-in unit) 2100; a play field 2500; a station control unit (not shown); and a display unit 2700. In the station unit ST, the token drop-in mechanism 2100 is placed on an upper near side, the display unit 2700 that is a display unit that functions as display means is placed on an upper far side, and the play field 2500 is placed at an upper center. The "near side" means a side on which the player is positioned during the game, the "far side" means a side opposite to the side on which the player is positioned during the game, and the "center" means an area between the "near side" and the "far side."

The token drop-in mechanism 2100 is a mechanism for the player to drop a token M into the pusher game machine 2000 during the game. The token M dropped into the token drop-in mechanism 2100 is conveyed via a token conveyance route (not shown) in the interior of the cabinet of the station unit ST to a lift-up hopper, and the resultant token M is temporarily retained by the lift-up hopper. The lift-up hopper includes: a token retaining unit for accumulating the token M; the lift-up unit for lifting up the token M to a predetermined height; and a token discharge unit (discharge unit) for discharging the token M that is lifted up at a predetermined timing. At a discharge opening of the token discharge unit, arranged is a token discharge route 2400 for leading the discharged token M to the play field 2500 in a manner to laterally swing. An upper end of the lift-up unit is placed above the play field 2500. As a result, the token discharge unit arranged at the upper end of the lift-up unit is placed above the play field 2500. Therefore, the token M temporarily accumulated in the token retaining unit arranged below the play field 2500 is raised above the play field 2500 by the lift-up unit, and thereafter, the raised token M is exited via the token discharge route 2400 from the token discharge unit, out onto the play field 2500.

Within the play field 2500, arranged mainly are: a main table 2501 that is a token mount table for retaining thereon the token M, and the pusher unit 2510 as a token extruding member which is mounted on the main table 2501. The pusher unit 2510 includes: a top surface (this is called a sub table) for retaining thereon the token M; a sloping table on which the token M that falls from the sub table slides; and a push-forward wall that pushes forward the token M retained on the main table 2501. Moreover, the pusher unit 2510, which is arranged to enable sliding on the main table 2501 in the play field 2500, makes a back-and-forth slide movement in a constant cycle or an arbitrary cycle. A part (far side) of the pusher unit 2510 is housed in a housing part (described later) arranged beneath the display unit 2700. The pusher unit 2510, which slides to come out of and into the housing part, makes a back-and-forth reciprocating movement.

With the sub table, a frame member of the display unit 2700 comes into contact in a manner to enable sliding. Therefore, when the pusher unit 2510 moves to a direction in which it is housed in the housing part, the token M on the sub table is pushed forward by the frame member. By the pushing forward, some tokens M on the sub table fall onto the sloping table. Some tokens M that fall from the sub table enter into an opening (this is called a "chucker") that is a token pass-through opening arranged on the sloping table. The remaining tokens M fall directly onto the main table 2501 and are retained on the main table 2501.

The tokens M on the main table 2501, similar to the tokens M on the sub table, are pushed forward by the slide movement of the pusher unit 2510. That is, the pusher units 2510 are seamlessly mounted on the main table 2501, and thus, when the pusher unit 2510 is moved in a discharge direction from the housing part, the tokens M on the main table 2501 are pushed forward by the push-forward wall on the front surface of the pusher unit 2510. By the pushing forward, some tokens M on the main table 2501 fall. Out of the tokens M that fall, the token M that falls from an end on the player side (this is called a "front end") to a token fall groove is paid to the player, and the other tokens M, e.g., the tokens M that fall from both sides (these are called "side ends") of the main table 2501 are stocked in a predetermined retaining unit within the station unit ST.

Besides, as shown in FIG. 5, the station unit ST includes a ball drop-in mechanism 2800 on at least one side. The ball drop-in mechanism 2800 is configured to drop balls B1 and B2 that are spherical objects (as differently shaped objects described later) into the play field 2500, and includes a ball drop-in slope 2801 and a ball drop-in position drawing mechanism 2810. The balls B1 and B2 are objects for drawing used for executing a bingo game described later.

The ball drop-in slope 2801, which is configured to lead the balls B1 and B2 dropped in from a ball carrier 2520 described later to the ball drop-in position drawing mechanism 2810 by gravity, is formed as a downhill slope. The ball drop-in position drawing mechanism 2810 is configured to draw a position on the play field 2500 onto which the balls B1 and B2 are dropped. Thus, the balls B1 and B2 dropped in from the ball carrier 2520 described later to the station unit ST are dropped in via the ball drop-in slope 2801 and the ball drop-in position drawing mechanism 2810 onto the play field 2500.

As shown in FIG. 5, the station unit ST includes a ball transportation mechanism 2900 on at least one side. The ball transportation mechanism 2900 is configured, when the balls B1 and B2 fall from the main table 2501 in the play field 2500 onto the token fall groove arranged on the near side, to transport the balls B1 and B2 to the satellite drawing apparatus 2001, and includes a ball conveying route (not shown), a ball transporting unit 2910, and a ball transporting unit traveling slope 2901. The ball conveying route is arranged below the front end of the main table 2501, and leads the balls B1 and B2 that fall from the front end to the ball transporting unit 2910. The ball transporting unit 2910 is configured to transport the balls B1 and B2 received via the ball conveying route, to the satellite drawing apparatus 2001, and travels on the ball transporting unit traveling slope 2901 according to control of the control unit of the station unit ST. The balls B1 and B2 transported to the satellite drawing apparatus 2001 are handed over to the ball carrier 2520.

Moreover, the station unit ST includes a token payout mechanism 2030, and as a result of the token payout mechanism being driven, the tokens M of which the number of pieces is equal to that of the tokens M that fall onto the token fall groove from the front end of the main table 2501 are discharged to the retaining unit 2101 of the token drop-in mechanism 2100.

Next, a control system of the pusher game machine 2000 will be explained.

Figure 6:
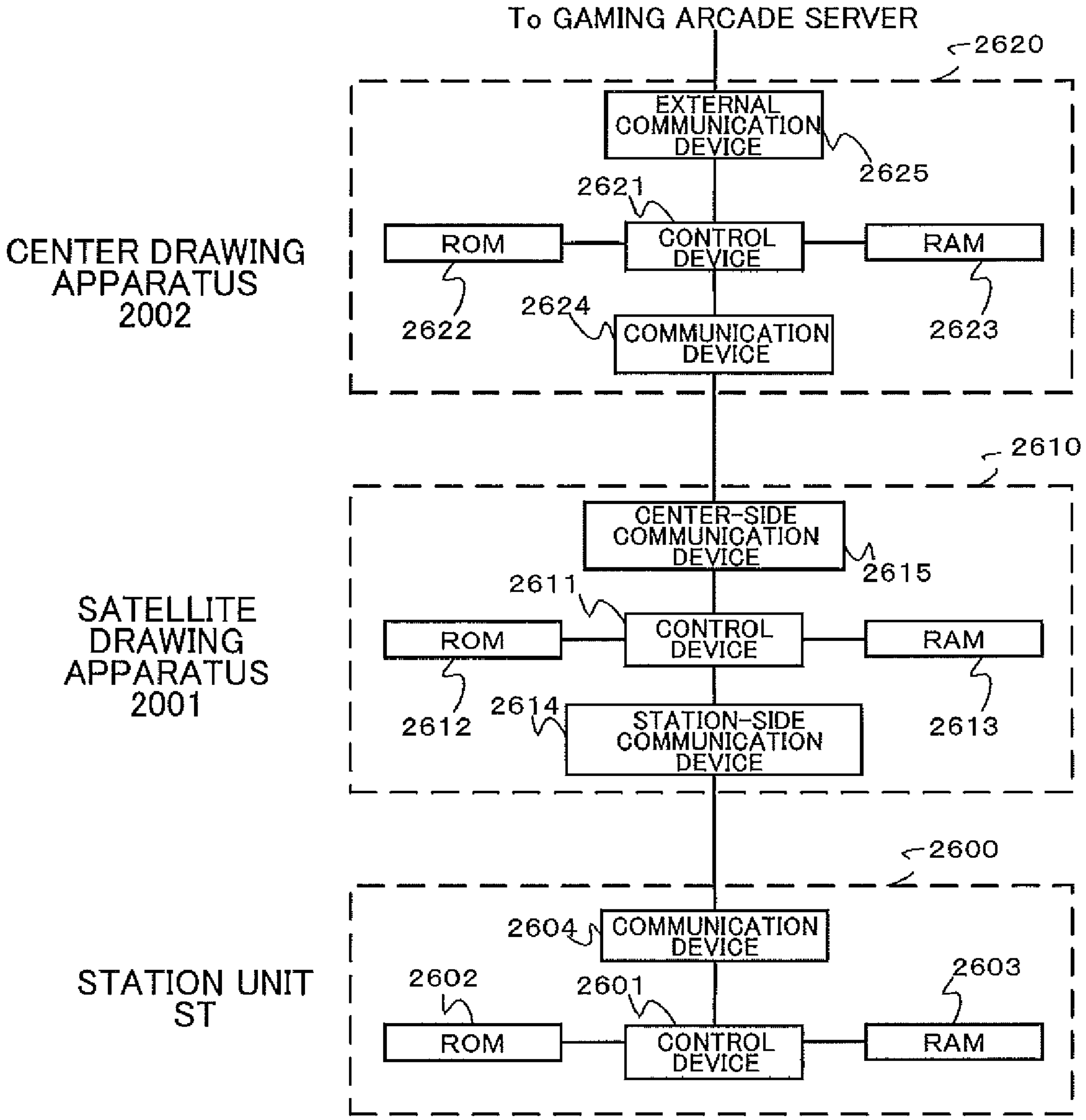
FIG. 6 is a block diagram showing a main configuration of a game control system of the same pusher game machine.

FIG. 6 is a block diagram showing a main configuration of a game control system of the pusher game machine 2000. In this block diagram, for the sake of explanation, configurations of a drive control system for driving each unit according to the game progress and any other systems are omitted.

The game control system of the pusher game machine 2000 is configured mainly by: a control unit 2600 at the station unit ST; a control unit 2610 of the satellite drawing apparatus 2001; and a control unit 2620 of the center drawing apparatus 2002. The control unit 2600 of the station unit ST mainly assumes a role of overall process control of a slot game and a bingo game described later, the control unit 2610 of the satellite drawing apparatus 2001 mainly assumes a role of control of a physical drawing of the bingo game and transportation control of the balls B1 and B2, and the control unit 2620 of the center drawing apparatus 2002 mainly assumes a role of a single-unit jackpot drawing control described later and overall control of the pusher game machine 2000.

The control unit 2600 of the station unit ST is configured mainly by: a control device 2601; a ROM 2602; a RAM 2603; and a communication device 2604. The control device 2601 executes various types of programs stored in the ROM 2602 so as to perform various types of controls. The ROM 2602 stores, for example, execution programs for various types of controls that should be performed in the control unit 2600 of the station unit ST. The RAM 2603 is for temporarily storing various types of data or information. The communication device 2604 is for performing data communication with the control unit 2610 of the satellite drawing apparatus 2001. Although not shown, the station unit ST includes a performance unit as performance means, such as a speaker and an illuminating device, used for various types of performances, and the control device 2601 controls these performance units so as to carry out various types of performances.

The control unit 2610 of the satellite drawing apparatus 2001 is configured mainly by: a control device 2611; a ROM 2612; a RAM 2613; a station-side communication device 2614; and a center-side communication device 2615. The control device 2611 executes various types of programs stored in the ROM 2612 so as to perform various types of controls. The ROM 2612 stores, for example, execution programs for various types of controls that should be performed in the control unit 2610 of the satellite drawing apparatus 2001. The RAM 2613 is for temporarily storing various types of data or information. The station-side communication device 2614 is for performing data communication with the control unit 2600 of the each station unit ST belonging to the satellite unit SA. The center-side communication device 2615 is for performing data communication with the control unit 2620 of the center drawing apparatus 2002. Although not shown, the satellite unit SA includes a performance unit as performance means, such as a speaker and an illuminating device, used for various types of performances, and the control device 2611 controls these performance units so as to carry out various types of performances.

The control unit 2620 of the center drawing apparatus 2002 is configured mainly by: a control device 2621; a ROM 2622; a RAM 2623; a communication device 2624; and an external communication device 2625. The control device 2621 executes various types of programs stored in the ROM 2622 so as to perform various types of controls. The ROM 2622 stores, for example, execution programs for various types of controls that should be performed in the control unit 2620 of the center drawing apparatus 2002. The RAM 2623 is for temporarily storing various types of data or information. The communication device 2624 is for performing data communication with the control unit 2610 of each satellite unit SA. The external communication device 2625 is for performing data communication via a LAN with an external device such as a gaming arcade server 5000. Although not shown, the center drawing apparatus 2002 includes a performance unit as performance means, such as a speaker and an illuminating device, used for various types of performances, and the control device 2621 controls these performance units so as to carry out various types of performances.

Figure 7:
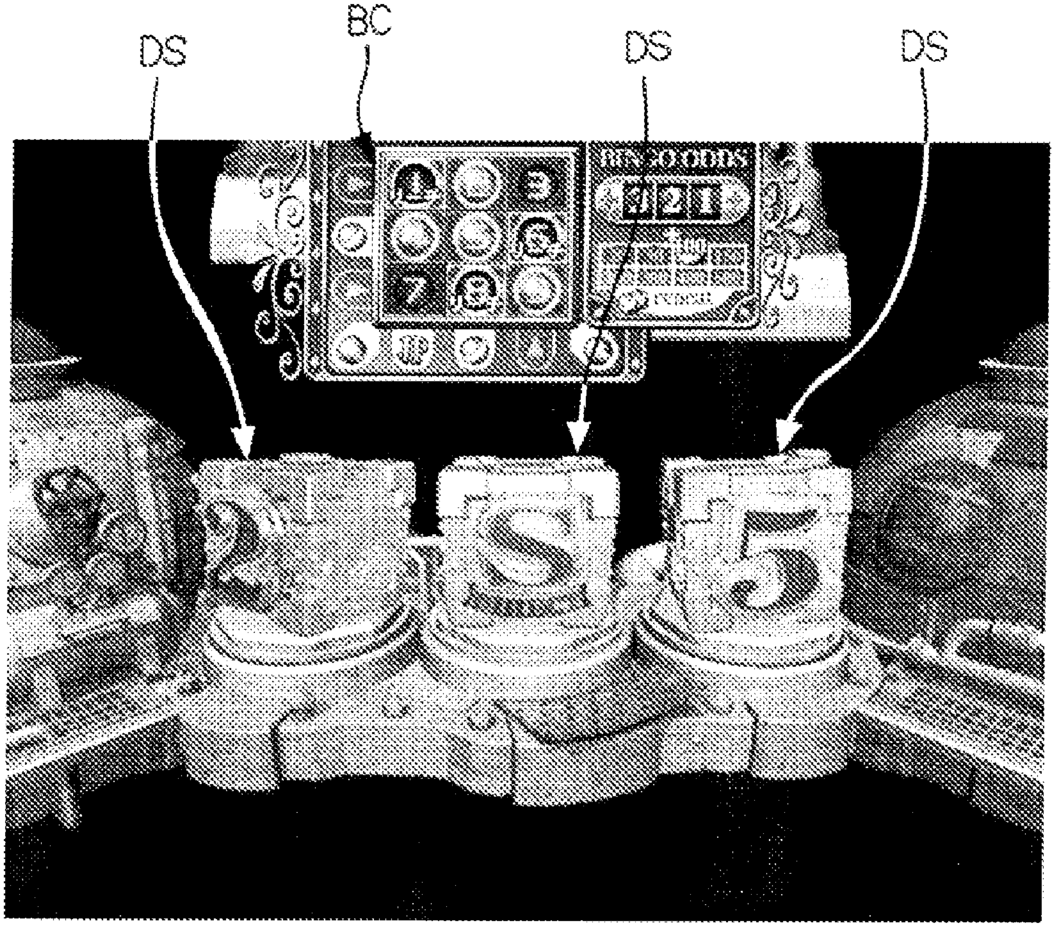
FIG. 7 is an explanatory view showing an example of a slot game screen displayed on a display unit of the same pusher game machine.
Figure 8:
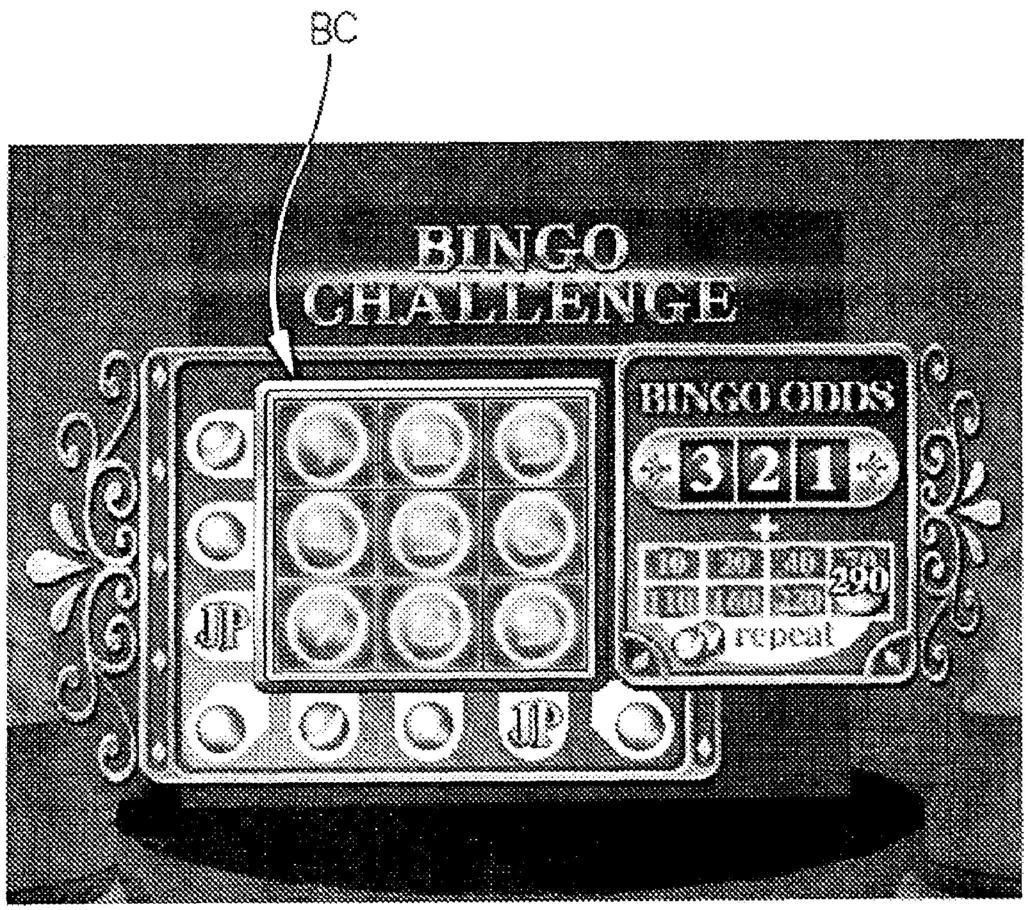
FIG. 8 is an explanatory view showing an example of a bingo game screen displayed on the display unit of the same pusher game machine.

In the above-described configuration, in the pusher game machine 2000, in addition to the pusher game, a slot game is performed by displaying a slot game screen as shown in FIG. 7 on the display unit 2700, and a bingo game is performed by displaying a bingo game screen as shown in FIG. 8 on the display unit 2700. In the pusher game machine 2000, a single-unit jackpot drawing using the center drawing apparatus 2002 is also performed. On the display unit 2700, a single-unit accumulated token count indicating the number of pieces to be paid out in a single-unit jackpot drawing described later and a total accumulated token count indicating the number of pieces to be paid out in a total jackpot drawing described later are displayed.

The slot game is a digital drawing game in which the control unit 2600 at the station unit ST mainly performs a drawing digitally. This slot game is started under the condition that the token M enters into any one of chuckers arranged on the sloping table at the pusher unit 2510. The slot game screen shown in FIG. 7 is displayed on the display unit 2700 during a period when the bingo game described later does not progress. When the token M enters into any one of the chuckers and thereby the slot drawing start condition is satisfied, the control unit 2600 performs display control to rotate three dice-shaped slots DS. In the digital drawing of the slot game, the control unit executes a predetermined drawing program, and checks a generated random number in reference to a predetermined winning table so as to determine whether to win any payout-symbol combination or lose. Thereafter, where a winning payout-symbol combination is determined, the control unit 2600 performs display control to stop the rotation of the three dice-shaped slots DS so that a combination of symbols relating to the winning payout-symbol combination is stopped and displayed on the display unit 2700.

In the present embodiment, as a payout-symbol combination for a digital drawing, prepared are: a minor payout-symbol combination A in which three tokens are supplied to the play field 2500; a minor payout-symbol combination B in which eight tokens are supplied to the play field 2500; a ball supply payout-symbol combination in which the ball B1 is supplied to the play field 2500; a normal bonus payout-symbol combination in which thirty tokens are supplied to the play field 2500; a probability-change bonus payout-symbol combination in which thirty tokens are supplied to the play field 2500 and a winning table at which a winning probability is set to be higher is used in subsequent digital drawings; a direct satellite payout-symbol combination in which the ball B1 is directly supplied to the satellite drawing apparatus 2001; a direct center payout-symbol combination in which the ball B1 is directly supplied to the center drawing apparatus 2002, and other payout-symbol combinations. The winning probability of each of these payout-symbol combinations is set to be lowered according to the above-described order. It is noted that, which payout-symbol combination is prepared or to which winning probability of each of the payout-symbol combinations is set is determined arbitrarily. For example, it may be possible to configure that various benefits are given to a player such as direct payout of tokens M to the player. Then, when these payout-symbol combinations are won, the control device 2601 of the station unit ST controls the speaker or the illumination device, etc., so as to carry out individual performance to liven up the winning.

The bingo game is a physical drawing game which progresses by a physical drawing using two types of balls B1 and B2 and the satellite drawing apparatus 2001. The bingo game progresses by the control unit 2610 of the satellite drawing apparatus 2001 and the control unit 2600 at the station unit ST. In the bingo game, the control unit 2610 of the satellite drawing apparatus 2001 mainly controls a drawing for determining winning bingo numbers of the bingo game. The control unit 2600 of each of the station units ST belonging to the satellite unit SA including the satellite drawing apparatus 2001 is mainly in charge of controlling the performance of the bingo game, a decision of the establishment of BINGO, and so on. In the present embodiment, the balls B1 and B2 are moved by the satellite drawing apparatus 2001, by which a physical drawing is performed in which one winning bingo number (a winning target) is selected from a plurality of bingo numbers (drawing targets) different from each other. In the physical drawing of the present embodiment, one winning bingo number is selected from the bingo numbers of “1” through “9”. Then, array information of the bingo card having these bingo numbers of “1” through “9” arrayed in a matrix is generated individually for each of the station units ST by the control unit 2600 that is as an array-information producing unit which functions as array-information producing means for the station unit ST, for example. Thereafter, a bingo card image BC in which images of the bingo numbers of “1” through “9” (drawing target images) are arrayed according to the array information is displayed on the display unit 2700 of each of the station units ST, as shown in FIG. 8. Then, when the BINGO is established, the control device 2601 of the station unit ST or the control device 2611 of the satellite unit SA each controls the speaker, the illuminating device, etc., so as to carry out an individual performance to liven up the establishment of BINGO.

In the single-unit jackpot drawing, when either one of conditions under which the single-unit jackpot drawing is started is satisfied, i.e., the balls B1 and B2 are thrown into a winning spot to which a right of starting a single-unit jackpot drawing in the center drawing apparatus 2002 in the physical drawing in the satellite drawing apparatus 2001 in the above-described bingo game is assigned, or the center combination is directly won in the above-described slot game, the control device 2621 of the control unit 2620 in the center drawing apparatus 2002 executes a single-unit jackpot execution program stored in the ROM 2622 so as to start the single-unit jackpot drawing. Then, in the center drawing apparatus 2002, the ball B1 is moved thereby to perform the physical drawing that determines whether a single-unit jackpot award is won or lost (including a case where awards other than the single-unit jackpot award are won). When the single-unit jackpot award is won, the control device 2621 of the center drawing apparatus 2002 controls the speaker, the illuminating device, etc., so as to carry out an individual performance to liven up the winning of the single-unit jackpot award.

Moreover, when the single-unit jackpot award is won, the control device 2621 reads out the single-unit JP retaining count data that is payout amount data from the RAM 2623, and performs a process for supplying the tokens M having the number of pieces indicated by a count value of that data, to the play field 2500 of the station unit ST that has satisfied the condition under which the jackpot drawing is started. At this time, another option would be: a token supply command is output to the control device 2601 of the control unit 2600 at the station unit ST from the control device 2621, and under the control of the control device 2601, the token M is supplied to the play field 2500 by using a method similar to a normal token supply process. In this case, however, the number of pieces of tokens to be supplied when the single-unit jackpot award is won is obtained by accumulatively adding the number of pieces equivalent to a part of the number of pieces of tokens to be dropped into all the station units ST (for example, 0.03 pieces) from a time when the single-unit JP retaining count data is reset to an initial value (for example, 500 pieces), therefore, it is a great number. For this reason, instead of the normal token supply process, a process using an original token supply mechanism may be optionally adopted. This is preferable as a performance carried out when the single-unit jackpot award is won. Moreover, when the single-unit jackpot award is won, the control device 2621 resets the single-unit JP retaining count data stored in the RAM 2623, to the initial value.

[Slot machine 3000] Next, the token-operated game machine 3000 will be explained.

The token-operated game machine 3000 is a slot machine.

Figure 9:
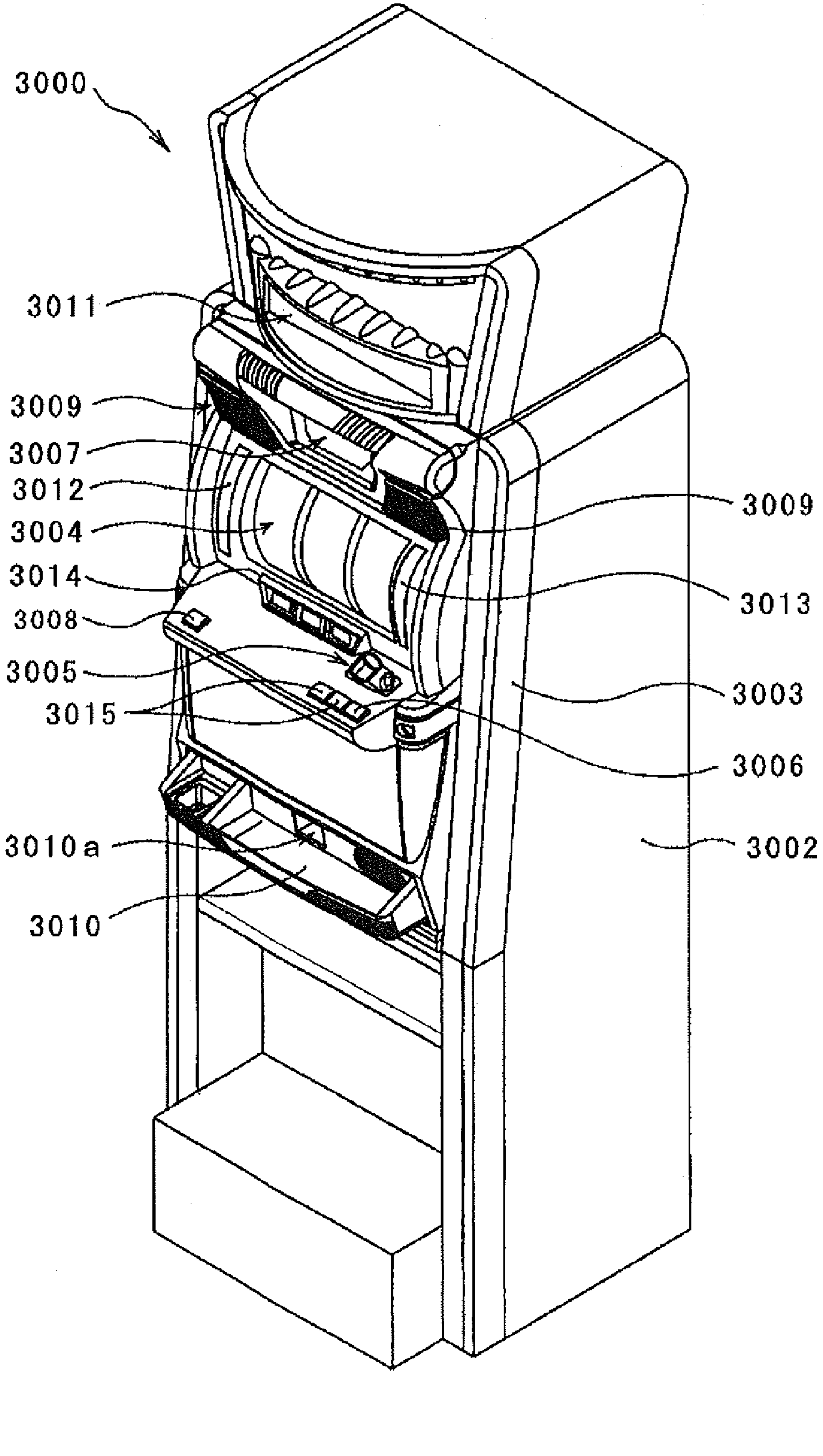
FIG. 9 is a perspective view showing the outline of a slot machine constituting the same game system.

FIG. 9 is a perspective view showing the outline of a slot machine 3000 according to the present embodiment.

The slot machine 3000 includes a box-type cabinet 3002, a front panel 3003 attached to a front surface side of the cabinet 3002 in a freely openable and closable manner, and other components. On the front panel 3003, arranged are: a display window 3004 for displaying part of a varying display unit described later; a token drop-in opening 3005; a start button 3006 as a start operation device; a dice display window 3007; a credit settlement button 3008; a speaker 3009; a token receiving tray 3010 having a token payout opening 3010*a*; a performance panel 3011; a count display unit 3014; a BET operation unit 3015; and so on. The speaker 3009 and the performance panel 3011 that are performance units function as performance means of the slot machine 3000. Moreover, on the performance panel 3011, various types of information such as a total accumulated token count indicating the number of pieces of payouts in the total jackpot drawing described later are displayed.

Inside the cabinet 3002, three reels that as three varying display units of which the outer peripheral surface is printed with a plurality of types of symbols are assembled. The three reels (hereinafter, in the order of a "left reel", a "middle reel", and a "right reel") are each rotated and driven by a reel drive motor (not shown) configured by a stepping motor. These reels are printed with a plurality of types of symbols such as "white 7", "blue 7", "green 7", "red 7", "cherry", and "blank" in a predetermined order. In the present embodiment, the symbol of "blank" configures neither one of the payout-symbol combinations. A main control circuit board on which electronic circuits are formed by various types of electronic components such as a CPU and a ROM, a token payout device having a token hopper capable of containing a large number of pieces of tokens, an internal speaker, and any other similar components are also assembled.

Figure 10:
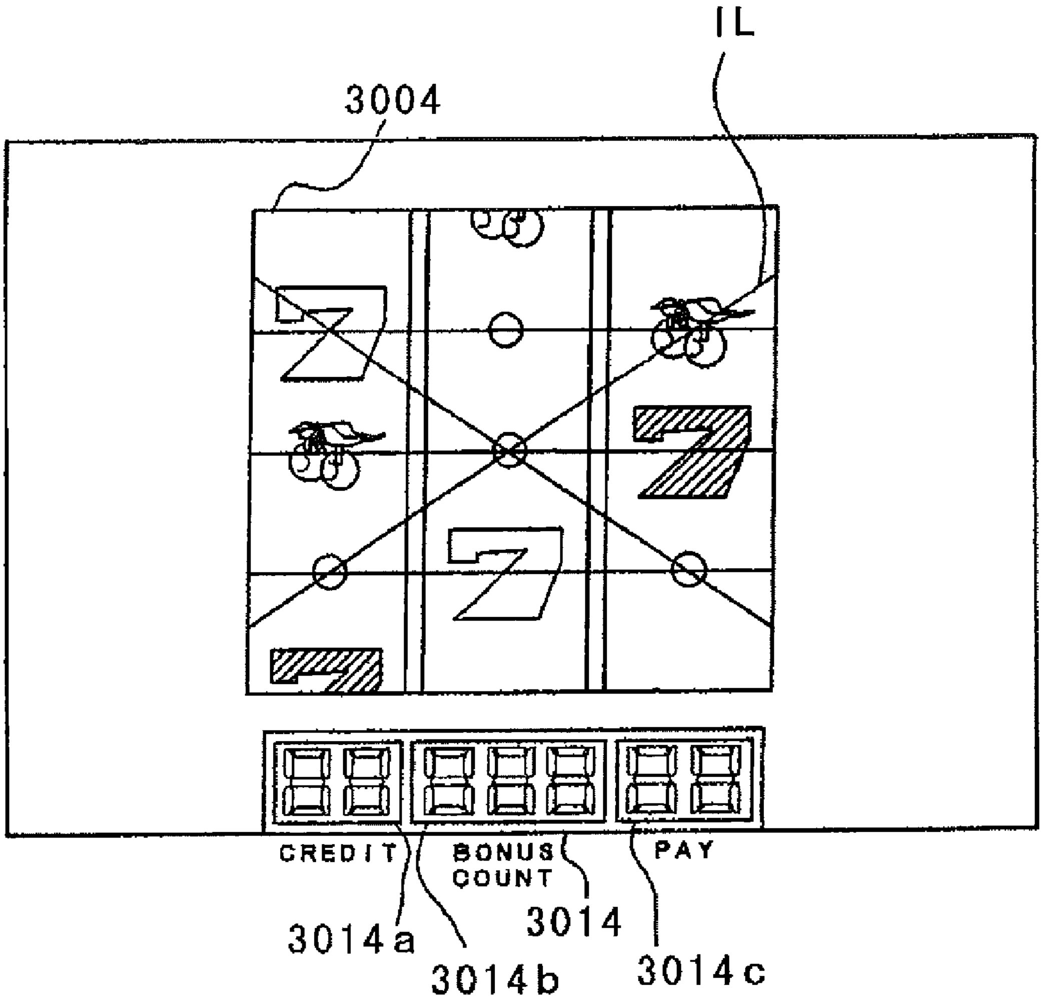
FIG. 10 is a detailed front view showing part of a front panel of the same slot machine.

FIG. 10 is a detailed front view showing part of the front panel 3003.

Symbols formed by about three images at a predetermined rotation position of each reel are to be visually recognized by a player through the display window 3004. In this display window 3004, five winning lines IL are depicted across all of the reels. When symbols relating to a payout-symbol combination corresponding to an award group previously defined on these winning lines IL become all the same in a combination (hereinafter, this is simply referred to as the "symbols become all the same in a payout-symbol combination"), a game value is imparted to a player, such as the tokens are paid out to the token receiving tray 3010 and a current period is moved to a special game period during which a special game can be played. It is noted that, in the slot machine 3000 according to the embodiment, the five winning lines IL are arranged; however, the number of winning lines may be optionally increased or decreased. Moreover, the winning line may suffice to be visually recognized by a CPU 17*a*, described later, for performing stop control of the slot machine, rather than to be visually recognized by the player.

The count display unit 3014 is provided with a credit display 3014*a*, a bonus-count display 3014*b*, a token payout count display 3014*c*, etc.

The BET operation unit 3015 is configured by two buttons, i.e., a 1BET button 3015*a* and a max BET button 3015*b*.

Figure 11:
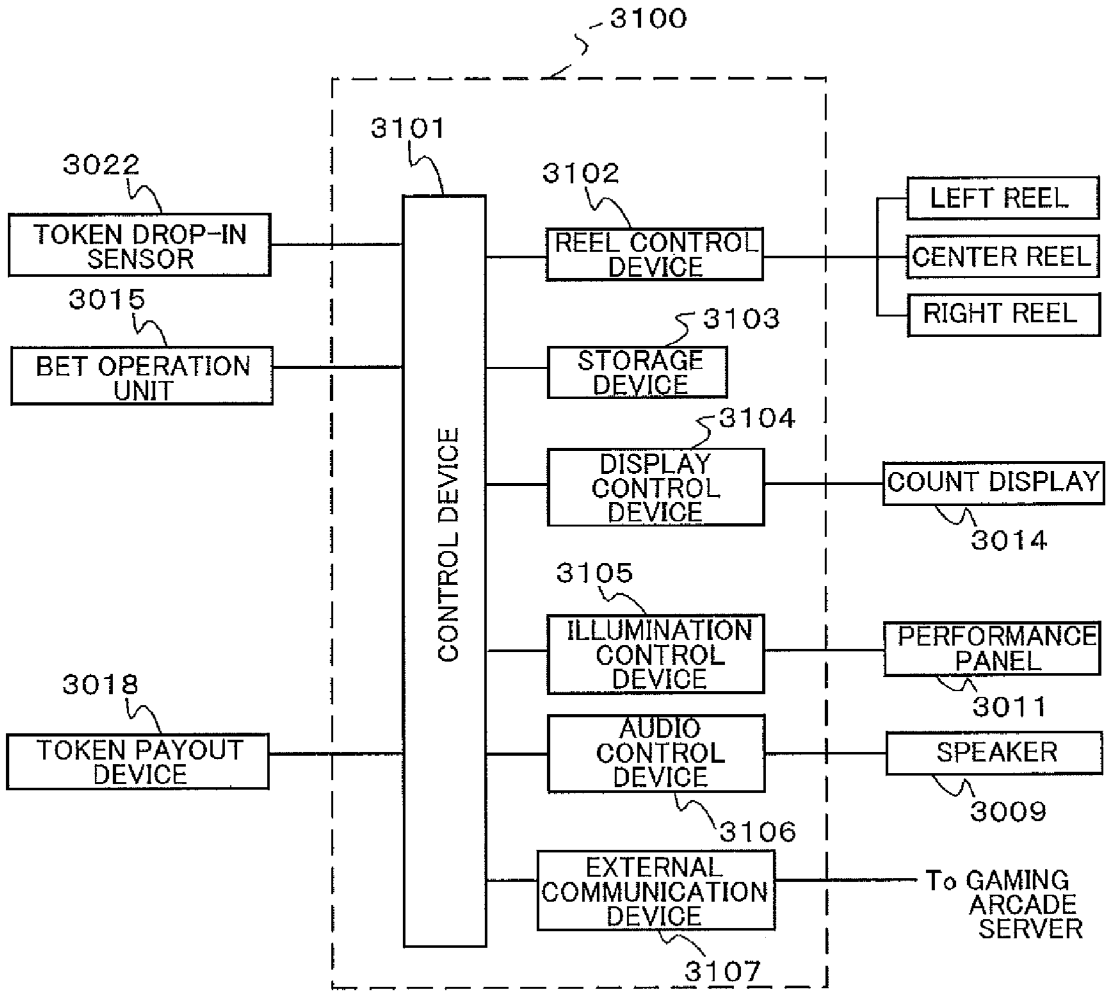
FIG. 11 is a control block diagram relating to a main configuration of the same slot machine.

FIG. 11 is a control block diagram relating to a main configuration of the slot machine 3000. The main control unit 3100 of the slot machine 3000 includes: a control device 3101; a reel control device 3102 for performing drive control for the three reels; a storage device 3103 in which various types of programs necessary for the game, various types of databases, etc., are stored; a display control device 3104 for performing display control of the count display unit 3014; an illumination control device 3105 for controlling illumination of the performance panel 3011, etc.; an audio control device 3106 for controlling a sound output from the speaker 3009; and an external communication device 3107 for performing a data communication with an external apparatus such as the gaming arcade server 5000 via a LAN. The main control device 1101 is connected not only to these devices but also to, for example, the token drop-in sensor 3022, the BET operation unit 3015, and the token payout device 3018.

Next, a flow of the game of the slot machine 3000 will be explained.

Before the game is started, as a preparation, a player first needs to drop a token into the token drop-in opening 3005. When a token is dropped by the player into the token drop-in opening 3005, the token passes through a passage (not shown) and falls onto the token hopper. In this passage, various components are arranged such as a fall opening through which a token smaller than a standard falls back to the token payout opening 3010*a*, a token block solenoid for returning or permitting the token to the token payout opening 3010*a* by blocking the passage of the token, and a token drop-in sensor 3022 configured by, for example, a photo sensor for detecting the passed tokens one by one. A token detection signal output from the token drop-in sensor 3022 that detects the token is forwarded to the control device 3101 of the main control unit 3100. In receipt thereof, by means of the display control device 3104, the control device 3101 performs control to increase a display count value by one on the credit display 3014*a* and to increase a value of credit count data stored in the storage device 3103 by one. Normally, a plurality of pieces of tokens are dropped in at once so as to increase the number of pieces of credit to a certain extent. When the player operates the BET operation unit 3015 to perform a bet operation, the control device 3101 decreases the value of the credit count data stored in the storage device 3103 by as much as the number of pieces to be bet, and at the same time, performs control to decrease the display count value on the credit display 3014*a* by as much as the number of pieces to be bet. Moreover, the control device 3101 recognizes the winning line IL that has become effective according to the number of pieces to be bet. It is noted that, unless the symbols become all the same in the payout-symbol combination on the effective winning line IL, the winning is not granted even when the symbols become all the same in the payout-symbol combination on an ineffective winning line IL.

When the start button 3006 is operated by the player, the control device 3101 that is a start-command receiving unit executes a start-command receiving program stored in the storage device 3103 thereby to function as start-command receiving means so as to receive a varying-display start command from its start button 3006. The control device 3101 that has received this varying-display start command, first, starts rotation drive of all the reels by the reel control device 3102. Further, the control device 3101 that has received the varying-display start command executes an award-group drawing program stored in the storage device 3103 so as to perform an internal drawing. In this case, the control device 3101 functions as means for performing an internal drawing to determine a winning in which any award group is selected out of a plurality of award groups or a loss in which neither award group is selected. The internal drawing is performed by checking random number data forwarded from a random-number generating circuit with a value on an award group drawing table stored in the storage device 3103. On this award-group drawing table, each random number is associated with any award group or the loss. As a result of such an association, any one of the award groups is won at an individual predetermined probability, or the loss occurs at a predetermined probability.

Rotation positions of the reels that start the rotation drive are respectively detected by a reel position sensor (not shown). The reel control device 3102 performs an arithmetic operation on the rotation speed of the reel based on an output signal from each reel position sensor. When the rotation speed of the reel is stabilized, the reel control device 3102 becomes capable of recognizing a position of each symbol on each reel based on the output signal from each reel position sensor. Then, the control device 3101 executes a stop control program stored in the storage device 3103, and based on a drawing result of the above-described internal drawing, performs stop control of the reel by the reel control device 3102 so that a combination of predetermined symbols is stopped and displayed on the winning line. Concretely, when any one of the award groups is won by the internal drawing, the control device 3101 performs stop control so that a combination of symbols relating to a payout-symbol combination corresponding to the award group that has won is stopped and displayed on the winning line IL. On the other hand, in the case of the loss as a result of neither one of the award groups being selected by the internal drawing, the control device 3101 performs stop control so that a combination of symbols corresponding to neither award group is stopped and displayed on the winning line IL.

In a normal game, the internal drawing is performed by using an award-group drawing table corresponding to that normal game. Examples of award groups that may be won by the internal drawing of this normal game include token payout awards of: a cherry award corresponding to a cherry combination formed by "cherry-ANY (any symbol pattern)-ANY (any symbol pattern)"; an ANY7 award corresponding to an ANY7 combination formed by a plurality of colors of "7" that are "ANY7 (any color of "7")-ANY7 (any color of "7")-ANY7 (any color of "7")"; a white 7 award corresponding to a white 7 combination formed by "white 7-white 7-white 7"; a blue 7 award corresponding to a blue 7 combination formed by "blue 7-blue 7-blue 7"; a green 7 award corresponding to a green 7 combination formed by "green 7-green 7-green 7"; and a red 7 award corresponding to a red 7 combination formed by "red 7-red 7-red 7." When any one of the token payout awards is won as a result of the internal drawing and the symbols corresponding thereto become all the same in a winning combination on the winning line IL, the control device 3101 causes the token payout count display 3014*c* of the count display unit 3014 to display the number of pieces of tokens to be paid out corresponding to the winning award. Then, the control device 3101 performs a token payout process for paying out the number of pieces of tokens corresponding to the winning award. Concretely, the control device 3101 increases a value of the credit count data stored in the storage device 3103 by as much as the number of pieces of tokens to be paid out, and at the same time, performs control to increase the token credit on the credit display 3014*a* by as much as the number of pieces of tokens to be paid out. When a token credit upper limit value is exceeded, the exceeded amount is paid out to the token receiving tray 3010 from the token payout opening 3010*a* by the token payout device 3018. According to the order in which the above-described award groups are described, the number of pieces of tokens that are paid out is larger.

[Jackpot System]

Next, the total jackpot drawing performed in the whole system will be explained.

Figure 12:
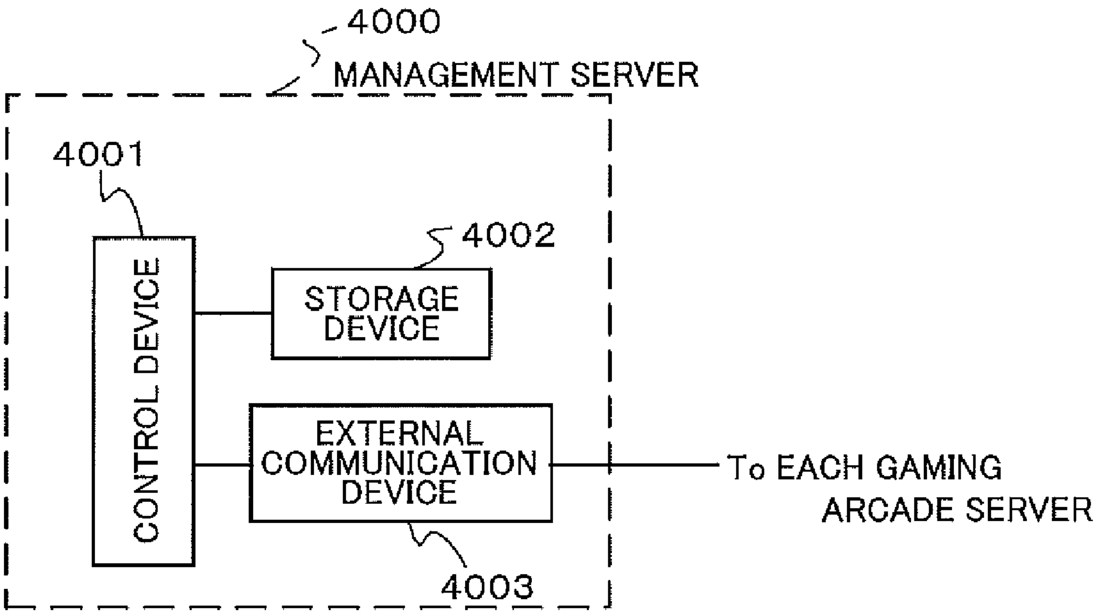
FIG. 12 is a control block diagram of a management server.

FIG. 12 is a control block diagram of the management server 4000 for performing progress control of the total jackpot drawing which is performed together with each gaming arcade server 5000.

The management server 4000 is configured mainly by a control device 4001, a storage device 4002 and an external communication device 4003. The storage device 4002 stores various types of control programs, and stores total accumulated token count data that is payout amount data of the whole system. The external communication device 4003 is for performing data communication via a WAN with an external apparatus such as the gaming arcade server 5000 at each gaming arcade.

Figure 13:
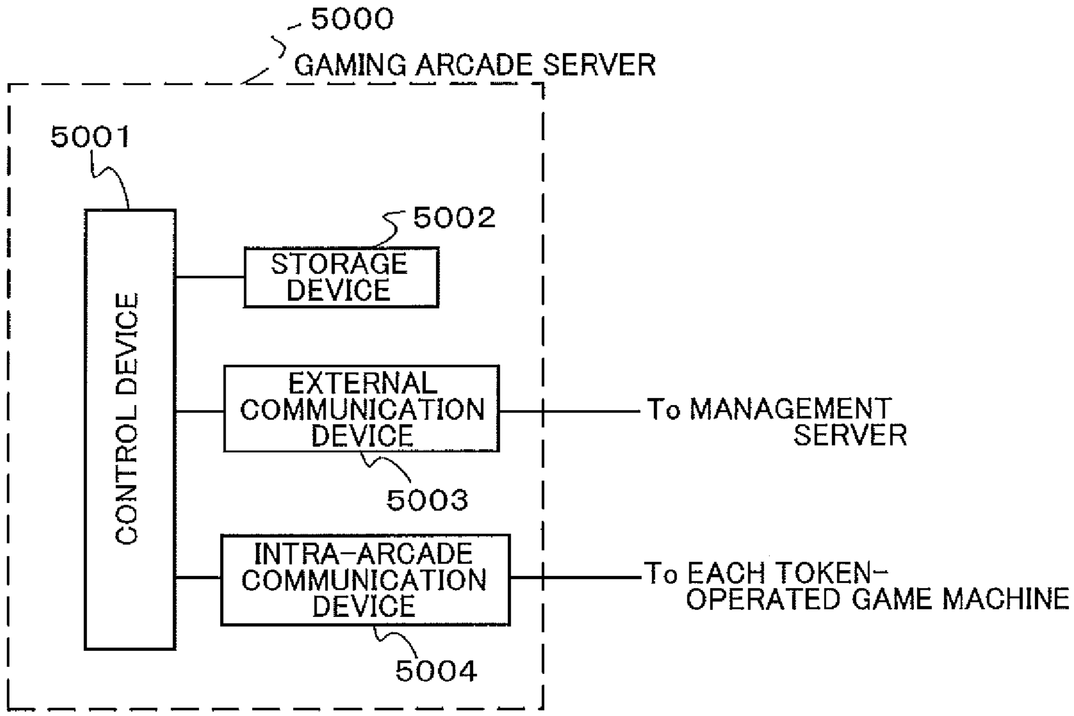
FIG. 13 is a control block diagram of a gaming arcade server.

FIG. 13 is a control block diagram of the gaming arcade server 5000 for managing a system within each gaming arcade and also performing data communication between the management server 4000 and each token-operated game machine at the gaming arcade.

The gaming arcade server 5000 is configured mainly by a control device 5001, a storage device 5002, an external communication device 5003 and an intra-arcade communication device 5004. The storage device 5002 stores various types of control programs. The storage device 5002 stores intra-arcade accumulated token count data that is a part of the tokens consumed in the token-operated game machines 1000, 2000, and 3000 within the gaming arcade constituting the game system, and also stores the total accumulated token count data forwarded from the management server 4000. The external communication device 5003 is for performing data communication via a WAN with an external apparatus such as the management server 4000. The external communication device 5003 is for performing data communication via a LAN with each of the token-operated game machines 1000, 2000, 3000, etc.

Figure 14:
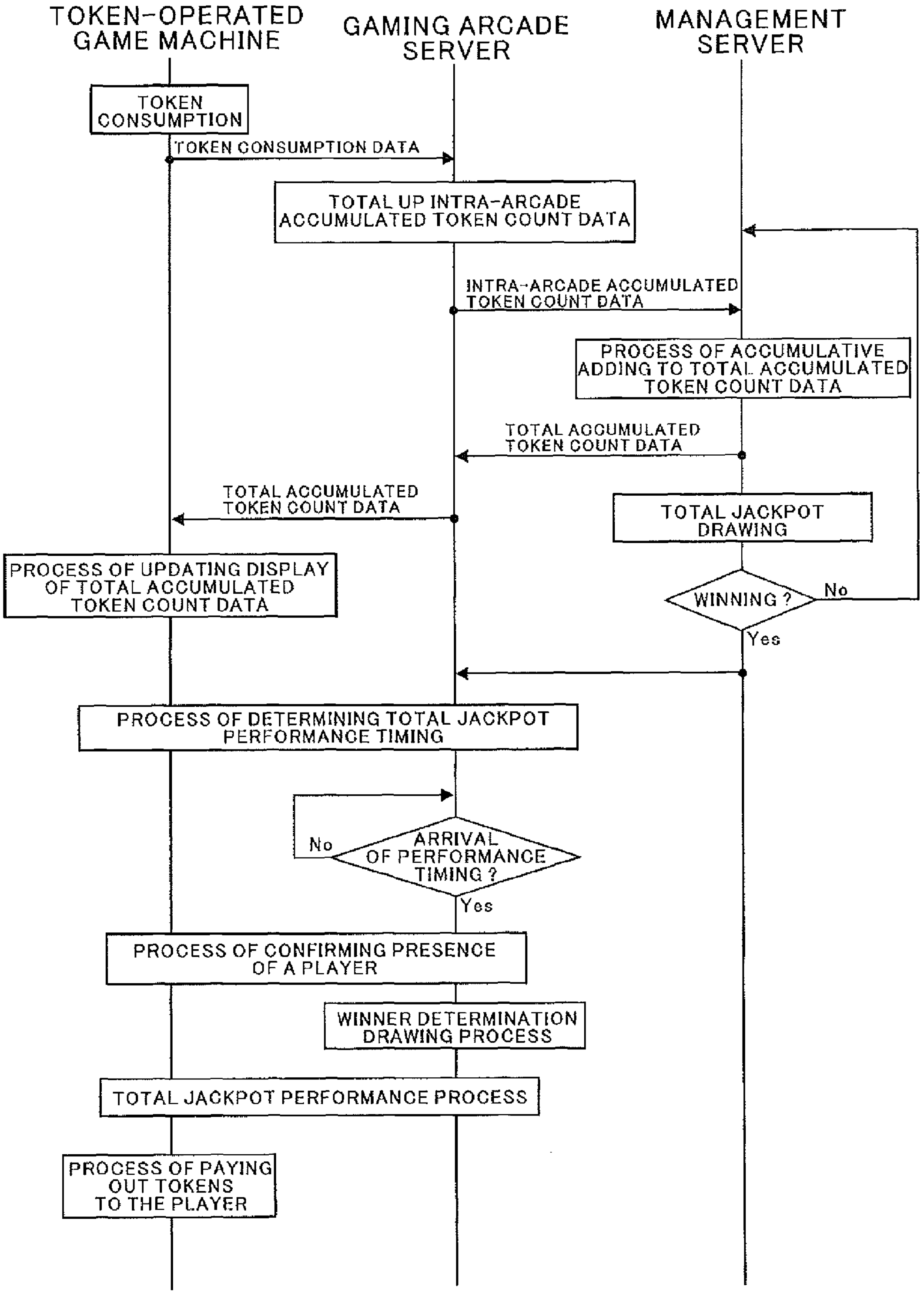
FIG. 14 is a sequence flowchart showing a flow of a total jackpot drawing.

FIG. 14 is a sequence flowchart showing a flow of the total jackpot drawing in the present embodiment. In FIG. 14, for the sake of explanation, only one token-operated game machine and one gaming arcade server are described.

In the game system, when a player consumes the tokens in each of the token-operated game machines 1000, 2000, and 3000, data indicating a consumption amount is forwarded to the gaming arcade server 5000 located in its gaming arcade. Based on the data forwarded from each of the token-operated game machines 1000, 2000, and 3000, the control device 5001 of the gaming arcade server 5000 accumulatively stores, as the intra-arcade accumulated token count data, a part of the tokens (for example, 0.01 pieces) consumed by the player in the token-operated game machines 1000, 2000, and 3000 within the gaming arcade connected to this gaming arcade server 5000 into the storage device 5002. Then, the control device 5001 transmits the intra-arcade accumulated token count data in the storage device 5002 to the management server 4000 at a predetermined timing. It is noted that the intra-arcade accumulated token count data to be transmitted this time is as much as that accumulatively stored between a last transmission time point and a current transmission time point.

At each reception of the intra-arcade accumulated token count data forwarded from each gaming arcade server 5000, the management server 4000 accumulatively adds the number of pieces of tokens indicated by the received data to the total accumulated token count data in the storage device 4002. Thereby, a part of the number of pieces of tokens (for example, 0.01 pieces) consumed in all the token-operated game machines constituting the present game system is added up as the total accumulated token count data. In the present embodiment, for example, an initial value of the total accumulated token count data is 1000 pieces of tokens and a part of the number of pieces of tokens consumed by the player is accumulatively added to this initial value.

In the present embodiment, also in the above-described pusher game machine 2000, the single-unit jackpot drawing is performed, and the accumulated token count data of the single-unit jackpot drawing is obtained by calculation only from the number of pieces of tokens consumed in that pusher game machine 2000. On the other hand, the accumulated token count data of the total jackpot drawing managed and run by the management server 4000 is obtained by calculation from the number of pieces of tokens consumed by all the token-operated game machines constituting the present game system. As a result, it is possible to increase the number of pieces of tokens to be paid out to a winner when the winner wins the jackpot drawing.

A specific process flow will be now explained. The control device 4001 of the management server 4000 receives the intra-arcade accumulated token count data transmitted from each gaming arcade server 5000 at a predetermined timing (for example, at intervals of 10 minutes) thereby, first, to perform a process for accumulatively adding to the total accumulated token count data in the storage device 4002, as shown in FIG. 14. Thereafter, the total accumulated token count data stored in the storage device 4002 at this time point is transmitted to the gaming arcade server 5000 that is a transmission source of the intra-arcade accumulated token count data that is received immediately before. The gaming arcade server 5000 that receives the total accumulated token count data transmits the same data to each of the token-operated game machines 1000, 2000, and 3000. Then, in each of the token-operated game machines 1000, 2000, and 3000 that receive that data, respective displays of the total accumulated token count are updated based on the received total accumulated token count data. In the present embodiment, the total numbers of pieces of accumulated tokens are individually displayed in each token-operated game machine. In this case, a display device for displaying the total accumulated token count may be arranged within the gaming arcade in order to omit the individual display in each token-operated game machine.

The total jackpot drawing in the present embodiment is started under the condition that the management server 4000 receives the intra-arcade accumulated token count data from the gaming arcade server 5000.

In the present embodiment, when receiving the intra-arcade accumulated token count data from each gaming arcade server 5000, the control device 4001 of the management server 4000 executes the total jackpot drawing program so as to perform the total jackpot drawing to determine whether the gaming arcade of the transmission source of that data is won or lost by checking the generated random number in reference to the predetermined winning table. When the winning is determined in the total jackpot drawing, the control device 4001 transmits winning data to the effect that the gaming arcade server 5000 is won in the total jackpot drawing, to the gaming arcade server 5000 that has transmitted the intra-arcade accumulated token count data that is a condition for starting the drawing.

Another method therefor may include the following, for example. That is, when receiving the intra-arcade accumulated token count data from any one of the gaming arcade servers 5000, the control device 4001 of the management server 4000 executes the total jackpot drawing program so as to perform the total jackpot drawing to determine which one of the gaming arcades win or neither one of the gaming arcades win by checking the generated random number in reference to the predetermined winning table. In this total jackpot drawing, the winning gaming arcade may not necessarily be determined. Therefore, there is a case where neither one of the gaming arcades wins in the total jackpot drawing. When winning of any one of the gaming arcades is determined in the total jackpot drawing, the control device 4001 transmits the winning data to the effect that the gaming arcade server 5000 is won in the total jackpot drawing, to the gaming arcade server 5000 (of the gaming arcade) relating to that winning.

It is noted that the condition for starting the total jackpot drawing is not limited to the above-described condition but may include any condition as long as it may occur at suitable time intervals. For example, the total jackpot drawing may be optionally started under the condition that a predetermined constant time is elapsed.

The gaming arcade server 5000 that has received the winning data performs a process for determining, as a winner for the total jackpot award, which one of the players who plays in the token-operated game machines 1000, 2000, and 3000 connected to the gaming arcade server 5000 in the gaming arcade. In this process, it is informed that there is a winner for the total jackpot drawing within the gaming arcade. In this way, a sense of expectation (such as any player can be a winner) is grown and an interest in who has won the game is developed. In doing so, a total performance (hereinafter, referred to as a "total jackpot performance") is carried out for getting attention of, for example, the player and the audience in the whole gaming arcade. This total jackpot performance needs to be carried out simultaneously at all the token-operated game machines 1000, 2000, and 3000 in the gaming arcade, and in this case, due to a certain reason related to the game progress at each of the token-operated game machines 1000, 2000, and 3000, a timing at which the performance is carried out (total jackpot performance timing) needs to be adjusted. Because at each of the token-operated game machines 1000, 2000, and 3000, the game is individually progressed, and thus, depending on a certain progress situation, the progress of that game may be impeded by the total jackpot performance, resulting in an undesirable case where a sense of enjoyment of the player is greatly decreased.

For example, in the horse-racing game machine 1000, if the total jackpot performance is suddenly started at a time when a race is reproduced by using the field unit 1002, the excitement of the game originally provided in that horse-racing game machine is significantly decreased, hence not preferable. Further, in the pusher game machine 2000, if the total jackpot performance is suddenly started in the middle of a drawing where a large amount of tokens to be paid out can be expected such as in a physical drawing of the bingo game and the single-unit jackpot drawing, the excitement of the game originally provided in that pusher game machine is significantly decreased, hence not preferable. Moreover, in the slot machine 3000, if the total jackpot performance is suddenly started in the middle of the winning performance when a large amount of tokens to be paid out such as in the green 7 award and the red 7 award is determined, the joy of the player is significantly decreased, hence, not preferable.

On the other hand, at each of the token-operated game machines 1000, 2000, and 3000, there is a timing at which adverse effect (such as decreasing the enjoyment originally provided in that token-operated game machine) is less caused even when the individual game progress is impeded by the total jackpot performance. For example, in the horse-racing game machine 1000, at a timing used for betting a token by the player, i.e., a timing used for purchasing a betting ticket, the adverse effect is less caused. Thus, this timing is suitable for starting the total jackpot performance. Further, for example, in the pusher game machine 2000, at a timing except for a middle of a drawing where a large amount of tokens to be paid out can be expected or a middle of the winning performance therefor, the adverse effect is less caused. Thus, this timing is suitable for starting the total jackpot performance. Moreover, for example, in the slot machine 3000, at a timing from a first slot game is ended to a subsequent slot game is started, concretely, from a time after the loss is determined in the last slot game or after the winning performance is ended to a time before the start button 3006 of the subsequent slot game is operated, the adverse effect is caused less. Thus, this timing is suitable for starting the total jackpot performance.

In each of the token-operated game machines 1000, 2000, and 3000 of the present embodiment, the game progress situations illustrated here are set in advance as situations where the total jackpot performance can be carried out.

Figure 15:
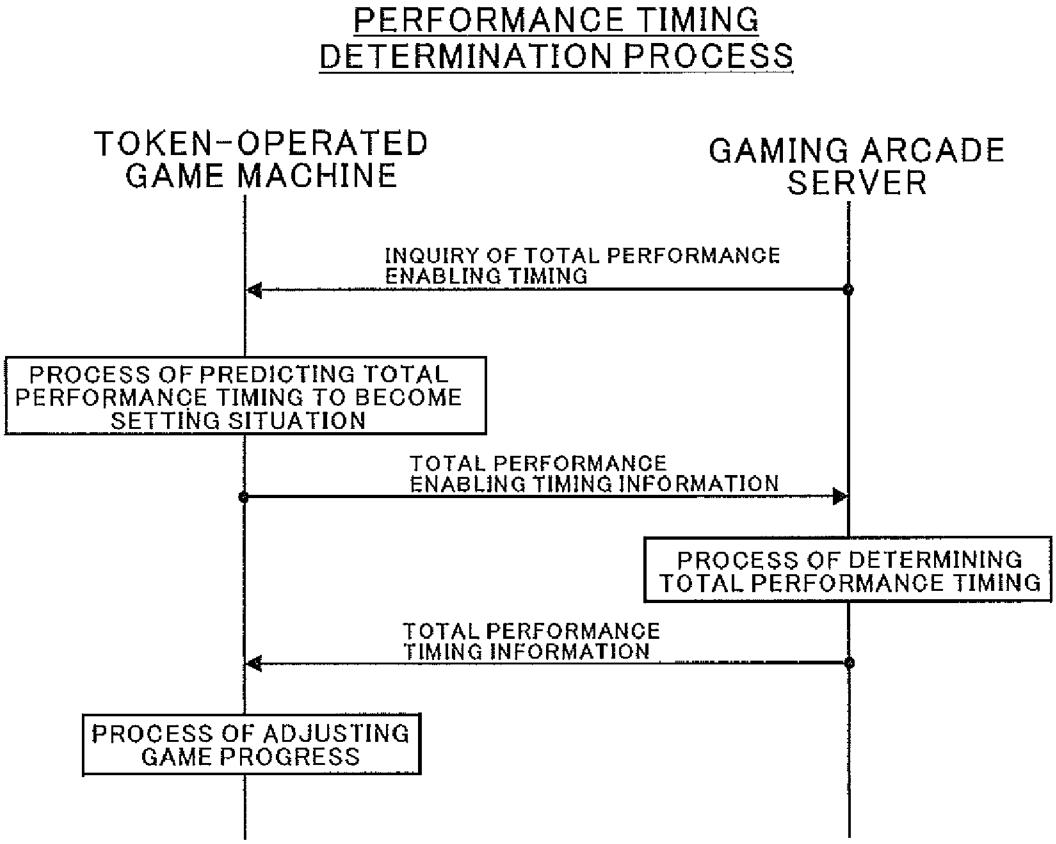
FIG. 15 is a sequence flowchart for explaining a determining process of a total jackpot performance timing.

FIG. 15 is a sequence flowchart for explaining a determining process of the total jackpot performance timing.

The gaming arcade server 5000 that has received the winning data, first, inquires all the token-operated game machines 1000, 2000, and 3000 through the LAN of a timing at which the game progress situation becomes capable of carrying out the total jackpot performance. In response to this inquiry, the control devices 1101, 2621, and 3101 that are timing anticipation processing units of the respective token-operated game machines 1000, 2000, and 3000 function as timing anticipation processing means, solely or working together with the other control devices 1201, 2601, and 2611, and execute a timing anticipation program so as to perform a process for predicting a timing at which each game progress situation becomes the above-described setting situation previously determined. Then, the control devices 1101, 2621, and 3101 of the respective token-operated game machines 1000, 2000, and 3000 send total performance enabling timing information indicating the anticipated timing, back to the gaming arcade server 5000 from the external communication devices 1108, 2625, and 3107. The control device 5001 that is a total performance timing determining unit of the gaming arcade server 5000 functions as total performance timing determining means, and based on the total performance enabling timing information forwarded from each of the token-operated game machines 1000, 2000, and 3000, determines the total performance timing at which the total jackpot performance is carried out. Concretely, based on each total performance enabling timing information, an earliest timing at which the total performance enabling timings of all the token-operated game machines 1000, 2000, and 3000 overlap is specified, and the resultant timing is determined as a total performance timing. Then, information on the determined total performance timing is transmitted to each of the token-operated game machines 1000, 2000, and 3000. In each token-operated game machine that has received the information, at the determined total performance timing, the game progress is controlled so that the game progress situation at each token-operated game machine becomes the above-described predetermined setting situation where the total jackpot performance can be carried out. A specific method of controlling is as follows: the above-described setting situation is stored in each of the token-operated game machines 1000, 2000, and 3000, the stored information on the setting situation is read out to perform the game progress control, or the above-described setting situation is previously installed in a game progress control-use program, and the game progress control is performed according to a content of that program.

It is noted that, in order for the game progress situation to become the above-described setting situation at the exact timing of the total performance timing determined by the control device 5001 of the gaming arcade server 5000, it may need to perform a fine adjustment for the game progress in the individual token-operated game machines 1000, 2000, and 3000.

As examples of a method for the fine adjustment in the horse-racing game machine 1000, a reproducing time of a race reproduction movie is shortened or lengthened in a reproducing process of a race reproduction movie executed after each race is ended. Concretely, the reproducing time may be shortened or lengthened by setting a time for starting the reproduction of the race reproduction movie in a middle stage of the race or a final stage thereof.

Further, another method for the fine adjustment in the pusher game machine 2000 is as follows: in the slot game executed at each station unit ST, the fine adjustment is performed by display control to lengthen or shorten a time from which the rotation of the three dice-shaped slots DS is started until it is stopped. Concretely, a speed for reproducing video from the start of the rotation of the three dice-shaped slots DS to the stop thereof may be lengthened or shortened, for example. In this case, there is no need of editing the video itself, thus, the display process is easy.

Moreover, the method for the fine adjustment in the slot machine 3000 is as follows: the fine adjustment is performed by drive control in which a time from a start of the rotation of the three reels to a stop thereof is lengthened or shortened.

The method for the fine adjustment is not limited to those described above, and it is determined, where appropriate, depending on a game content, etc., of each of the token-operated game machines 1000, 2000, and 3000.

In particular, in a game machine in which a digital drawing is performed, a method for lengthening or shortening a time period during which drawing performance-use video is displayed is effective as in the case of the above-described pusher game machine 2000.

It is noted that the method for determining the total performance timing is not limited to those described above.

For example, the control device 5001 that is a performance timing determining unit of the gaming arcade server 5000 is functioned as performance timing determining means. In doing so, rather than inquiring each of the token-operated game machines 1000, 2000, and 3000 of the total performance enabling timing, the total performance timing is determined according to a predetermined total performance timing determining condition. Then, the determined total performance timing is transmitted to each of the token-operated game machines 1000, 2000, and 3000, and the game progress control is performed in each token-operated game machine so that the game progress situation at each token-operated game machine becomes the above-described predetermined setting situation in which the total jackpot performance can be carried out at the determined total performance timing. This method is effective particularly when the token-operated game machine constituting the present game system is high in the degree of freedom of the control of the game progress situation.

When the total performance timing determined by the gaming arcade server 5000 arrives, as shown in FIG. 14, the control device 5001 of the gaming arcade server 5000 performs a player presence confirming process for recognizing the players who play at each of the token-operated game machines 1000, 2000, and 3000. Concretely, all the token-operated game machines 1000, 2000, and 3000 are inquired through the LAN of whether a player is present at each game machine. In the token-operated game machines 1000, 2000, and 3000 that have been inquired, the player presence confirming process according to the respective game content is performed.

Concretely, in the horse-racing game machine 1000, the players are each capable of playing at a plurality of stations, and thus, a process for confirming whether the player who plays the game is present is performed at each station. An example of a method for confirming includes: it is decided that there is a player at a station at which a magnetic card is inserted into a magnetic-card inserting slot 1015.

Further, also in the pusher game machine 2000, the players are each capable of playing at a plurality of station units, and thus, the process for confirming whether the player who plays the game is present is performed at each station unit. An example of a method for confirming this includes: it is decided that there is a player at a station unit at which there is a token on the retaining unit 2101 of the token drop-in mechanism 2100.

Moreover, since the slot machine 3000 is a game machine in which a single player plays, a process for confirming whether there is a player who plays the game at the slot machine 3000 is performed. An example of a method for confirming this includes: it is decided that there is a player when one or more credit count data is stored in the storage device 3103.

It is noted that the method for confirming whether a player is present is not limited to those described above, and may adopt any other methods.

Each of the token-operated game machines 1000, 2000, and 3000 performs the player presence confirming process, and then, sends back presence confirming information that is the process result of that confirming process to the gaming arcade server 5000 from the external communication devices 1108, 2625, and 3107. The control device 5001 of the gaming arcade server 5000 recognizes the station or the station unit or the slot machine played by the player (hereinafter, referred to as a "station and others") which are specified based on the presence confirming information forwarded from each of the token-operated game machines 1000, 2000, and 3000. Then, the control device 5001 executes a winner determination drawing program so as to perform a winner determination drawing process for determining which drawing target is won while respectively regarding the recognized station and others as the drawing targets. Concretely, a winning table on which each drawing target is assigned an equal winning probability is generated, and a drawing target corresponding to a random number generated based on the winning table is chosen, thereby determining the winning of the chosen drawing target. In the present embodiment, in the winner determination drawing process, in addition to the total jackpot award, prepared are: a big winning with a fixed number of pieces of tokens (big bonus award), a medium winning with a fixed number of pieces of tokens (middle bonus award), and a small winning with a fixed number of pieces of tokens (small bonus award). Therefore, for these awards, the control device 5001 sequentially determines the winning drawing target by using the above-described method.

It is noted that the winning probability of each drawing target is set equally; however, it is not always the case. For example, in the gaming arcade server 5000, token consumption data is regularly received from each of the token-operated game machines 1000, 2000, and 3000, and thus, the degree of contribution contributed to an increase in the total accumulated token count data of this time per each of the token-operated game machines 1000, 2000, and 3000 (i.e., a ratio of the token consumption data received from each of the token-operated game machines 1000, 2000, and 3000 for the purpose of increasing the total accumulated token count data of this time) can be specified. For the drawing target corresponding to the token-operated game machine with a high ratio, the winning probability may be relatively increased, and for the drawing target corresponding to the token-operated game machine with a lower ratio, the winning probability may be relatively decreased.

The winner determination drawing process is ended in this way, and the station and others that have won each award are determined. Then, the control device 5001 that is a control command transmitting unit of the gaming arcade server 5000 functions as control command transmitting means, informs each of the token-operated game machines 1000, 2000, and 3000 of the winning result, and at the same time, transmits the total performance control command to each of the token-operated game machines 1000, 2000, and 3000. Thereby, the total jackpot performance that utilizes the performance unit of each of the token-operated game machines 1000, 2000, and 3000 connected to the gaming arcade server 5000 is carried out.

Next, the total jackpot performance, which is characterized by the present invention, will be explained.

Figure 16:
FIG. 16 is an explanatory view showing an example of a jackpot start screen displayed on a display unit at each of the stations, etc., which are drawing targets.

In each of the token-operated game machines 1000, 2000, and 3000 that has received the total performance control command from the gaming arcade server 5000, jackpot start screens to the effect that a total jackpot drawing is started as shown in FIG. 16 are simultaneously displayed on the display 1011, the display unit 2700, and the performance panel 3011 that are display units functioning as each of display means of the station and others relating to the drawing target. At the station and others that are not the drawing targets, i.e., the station and others at which it is decided that a player is not playing the game, this jackpot start screen is not displayed.

In the present embodiment, at the station and others that are not drawing targets, a player is capable of playing a game of the token-operated game machine even during the total jackpot performance. Thus, there is a probability that during the total jackpot performance, an individual performance according to the game progress at the station and others that are not the drawing target is carried out. However, it is probable that if an individual performance not related to the total jackpot performance is carried out during the total jackpot performance, the total jackpot performance is impeded by the individual performance, thereby decreasing a good characteristic of the total jackpot performance. Therefore, in the present embodiment, the station and others that are not the drawing targets are controlled so that the individual performance according to the game progress is not carried out or a subtle performance only is carried out by decreasing a sound volume, a light amount, etc., so that the individual performance does not stand out during the total jackpot performance.

As a result of working solely or working together with the other control devices 1201, 2601, and 2611, the control devices 1101, 2621, and 3101 that are total performance control units of the respective token-operated game machines 1000, 2000, and 3000 function as total performance control means so as to carry out the total jackpot performance process by executing the total performance program. In particular, when the performance units such as the speaker and the illuminating device of each of the token-operated game machines 1000, 2000, and 3000 are caused to carry out a performance assuming part of the total jackpot performance, it becomes possible to carry out a single total performance (total jackpot performance) in which all the token-operated game machines 1000, 2000, and 3000 connected to the gaming arcade server 5000 are cooperated with each other. Concretely, for example, in all the token-operated game machines 1000, 2000, and 3000, illumination in blue and red are alternately emitted at the same timing, the same music or sound effect to the effect that the total jackpot drawing is started is output at the same timing, and other similar effects are provided.

It is noted that, in the present embodiment, the performance unit of each of the token-operated game machines 1000, 2000, and 3000 is configured by hardware different from each another, and thus, it is not possible to carry out the completely same performance. To solve this, it may be possible to carry out the total jackpot performance that gives a sense of unity as a whole by deliberately combining the performances different from each other at each of the token-operated game machines 1000, 2000, and 3000. As an example of music and sound effect, the horse-racing game machine 1000 may take a low-sound part, the pusher game machine 2000 may take a middle-sound part, and the slot machine 3000 may take a high-sound part.

There are specific, various performance methods for the total jackpot performance that can carry out a performance that gives a sense of unity as a whole, which is achieved as a result of a mutual synchronization of the performances provided by the performance units of each of the token-operated game machines 1000, 2000, and 3000.

Figure 17:
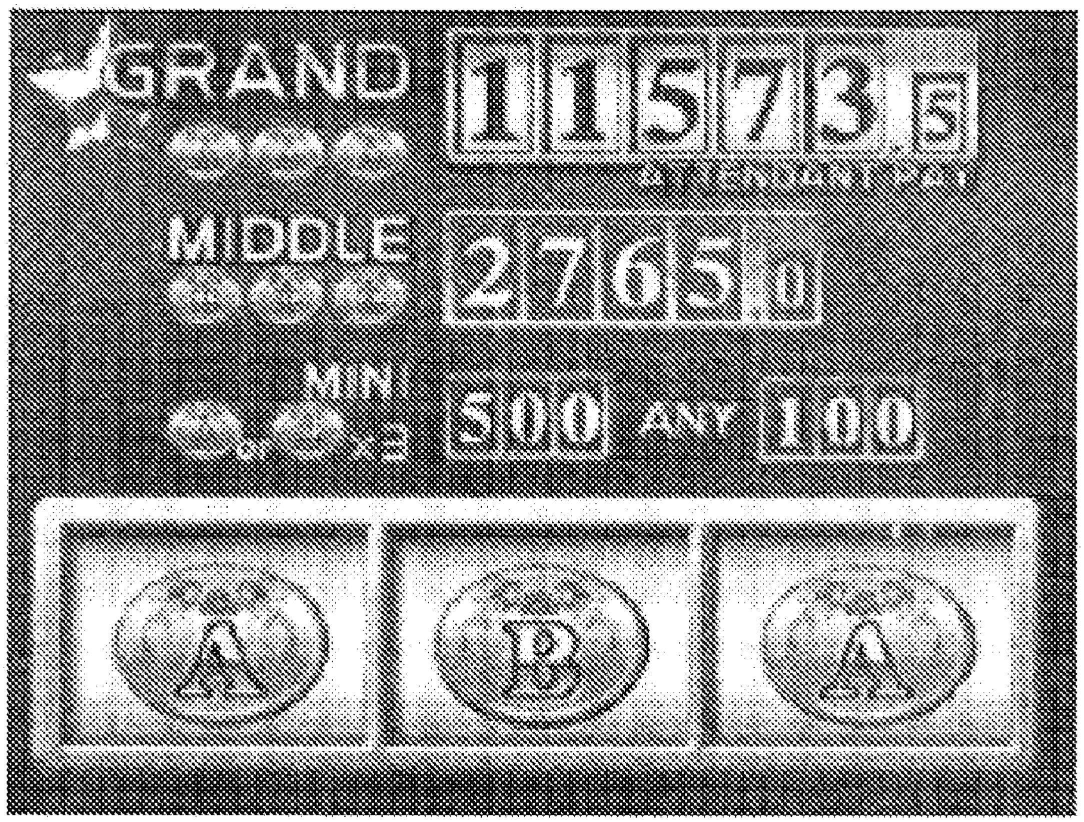
FIG. 17 is an explanatory view showing an example of a slot screen displayed on a display unit at each of the stations, etc., which are drawing targets.

After the total jackpot performance is started in this way, on each of the display units 1011, 2700, and 3011, a slot screen as shown in FIG. 17 is displayed subsequent to the jackpot start screen as shown in FIG. 16. Then, after the three reel images on the slot screen start a varying display, stop/display control is performed on the three reel images on each of the display units 1011, 2700, and 3011 so that symbols that reflect winning or losing at the respective corresponding station and others are stopped and displayed. Concretely, in the present embodiment, as described above, there are the four awards, i.e., the total jackpot award, the big bonus award, the middle bonus award, and the small bonus award, and the stop/display control is performed so that a combination of symbols corresponding to the respective awards is stopped and displayed on the slot screen. More particularly, on the display units 1011, 2700, and 3011 of the station and others that have won the total jackpot award, the stop/display control is performed so that three identical A symbols are stopped and displayed. On the display units 1011, 2700, and 3011 of the station and others that have won the big bonus award, the stop/display control is performed so that three identical B symbols are stopped and displayed. On the display units 1011, 2700, and 3011 of the station and others that have won the middle bonus award, the stop/display control is performed so that a combination of symbols mixed with the A symbols and B symbols is stopped and displayed. On the display units 1011, 2700, and 3011 of the station and others that have won the small bonus award, the stop/display control is performed so that a combination of symbols is stopped and displayed. In this case, the combination is: the A symbol or the B symbol is stopped and displayed on both a left reel image and a middle reel image, and neither the A symbol nor the B symbol is stopped and displayed on a right reel image (i.e., a blank symbol is stopped and displayed).

It is noted that there is no need that the jackpot start screen and the slot screen are completely the same in all the token-operated game machines 1000, 2000, and 3000. For example, these screens may be appropriately modified according to hardware with which these screens are displayed, or may be arranged according to the game content of each of the token-operated game machines 1000, 2000, and 3000.

Moreover, in the present embodiment, the varying display of the reel images on the slot screen is simultaneously started in all the token-operated game machines 1000, 2000, and 3000 connected to the gaming arcade server 5000; however, a completion timing at which the three reel images are stopped and displayed is differed depending on each award. Concretely, with respect to a time it takes for the stop display completion timing, it takes the least time for the station and others corresponding to the loss; it gradually takes more time in the order of the small bonus award, the middle bonus award, the big bonus award, and the total jackpot award.

Further, in the present embodiment, also while the varying display of the reel images on the slot screen is started and the stop display is completed, the drawing performance (total jackpot performance) is carried out. For example, after the varying display of the reel image is started on the slot screen, the performance is carried out so that the station and others illuminated with a light are sequentially switched. In this case, the illumination of the corresponding station and others (that are drawing targets of each of the token-operated game machines 1000, 2000, and 3000) are lit only in periods different from each other. Then, the drawing performance is carried out so that at the timing at which the stop display of the reel images at the station and others is completed, the illumination of the station and others is flashed.

After the drawing performance is ended in this way, a process for paying out tokens of which the number of pieces corresponds to that of each award is performed for the player who plays at the station and others that have won each award. This token payout may be performed by utilizing the token payout unit that is the token payout means of the token-operated game machines 1000, 2000, and 3000, or may be performed by way of an attendant pay in which the payout is made by an employee at the gaming arcade.

Thus, according to the present embodiment, when the three types of token-operated game machines 1000, 2000, and 3000 (of different types of machines) having hardware configurations different from each other cause the performance units (the speaker, the illuminating device, etc.) used for individual performance for the respective games to carry out a performance assuming part of the total jackpot performance, all the token-operated game machines 1000, 2000, and 3000 (within the same gaming arcade) connected to the gaming arcade server 5000 are cooperated with each other to carry out the single total performance (total jackpot performance). Thereby, it becomes possible to carry out an impressive, unusual performance beyond the type of each machine, resulting in expectation of obtaining an effect that encourages the player or audience visiting the gaming arcade to play at these token-operated game machines 1000, 2000, and 3000.

It is noted that, instead of being applied to the above-described types of machines, the token-operated game machine applicable to the game system of the present embodiment can be applied to a wide use.

Further, as an example of the total performance in the present embodiment, the performance regarding the jackpot drawing carried out in the whole game system is described; however, other performances may also be accepted. An example of the performance is: a performance for a certain event carried out when the event is organized at the same timing across the whole game system.

Moreover, if a performance not related to the tokens is carried out (for example, the total performance is not the total jackpot performance), the game apparatus applied to the game system may not be the token-operated game machine.

Further, in the present embodiment, the total performance processing apparatus and the jackpot drawing apparatus are configured with a common apparatus (management apparatus 4000 and gaming arcade server 5000); however, these apparatuses may be configured with separate apparatuses different from each other.

Also, the gaming arcade server 5000 of the present embodiment, which is a apparatus dedicated to the present game system to which only the token-operated game machines 1000, 2000, and 3000 participating in the total jackpot drawing are connected, may be a general gaming arcade server to which also the other token-operated game machines not participating in the total jackpot drawing are connected.

In the above-described embodiment, means realized by software such as a computer program may be optionally realized by hardware such as a circuit board and a chip. Moreover, means realized by hardware such as a circuit board and a chip may be optionally realized by software such as a computer program.

The invention claimed is:

1. A game system comprising:

two or more types of game apparatuses having hardware configurations different from each other, each of the game apparatuses including a performance unit to carry out a performance visually and audibly appealing to a player, and a game progress control unit to control game progress and performing game performance control according to the game progress by controlling the performance unit; and a total performance processing apparatus to execute a process to carry out a total performance in the two or more types of game apparatuses by using the performance unit provided in each of the two or more types of game apparatuses, wherein the total performance processing apparatus and the two or more types of game apparatuses are connected and communicate with each other, the total performance processing apparatus comprises a control command transmitting unit to transmit a total performance control command to carry out the total performance at a predetermined total performance timing to each of the two or more types of game apparatuses, and each of the two or more types of game apparatuses comprises a total performance control unit which is configured to control the performance unit according to the total performance control command from the total performance processing apparatus, and which is configured to execute total performance control to carry out a performance that is a different part of the total performance at the predetermined total performance timing such that the total performance is carried out.

2. The game system according to claim 1, wherein the two or more types of game apparatuses have hardware configurations constituting the performance unit different from each other.

3. The game system according to claim 2, comprising a jackpot drawing apparatus connected to and communicating with the total performance processing apparatus and the two or more types of game apparatuses, wherein the jackpot drawing apparatus comprises: a drawing unit to draw to determine whether a player who plays with the two or more types of game apparatuses wins a jackpot award or loses a game in which the player does not win the jackpot award; a storage unit to store payout amount data indicating a payout target amount to be paid out to the winning player when the drawing unit determines the winning of the jackpot award; a payout processing unit to perform a payout process to read out the payout amount data from the storage unit when the drawing unit determines the winning of the jackpot award, and executing a payout process to pay out a payout target of an amount indicated by the read-out payout amount data to the winning player; a payout amount increasing unit to accumulatively increase the amount indicated by the payout amount data stored in the storage unit when a predetermined payout amount increasing condition is satisfied; and a winning information transmitting unit to transmit winning information indicating the winning to the total performance processing apparatus when the drawing unit determines the winning of the jackpot award, and wherein the control command transmitting unit of the total performance processing apparatus transmits the total performance control command to each of the two or more types of game apparatuses when the winning information is received.

4. The game system according to claim 3, wherein the game progress control unit provided in each of the two or more types of game apparatuses does not perform the game performance control during the total performance control by the total performance control unit or performs the game performance control in which the performance is carried out in moderation.

5. The game system according to claim 2, wherein the game progress control unit provided in each of the two or more types of game apparatuses does not carry out the game performance control during the total performance control by the total performance control unit or performs the game performance control in which the performance is carried out in moderation.

6. The game system according to claim 1, comprising a jackpot drawing apparatus which is connected to and communicates with the total performance processing apparatus and the two or more types of game apparatuses, wherein the jackpot drawing apparatus comprises: a drawing unit to perform drawing to determine whether a player who plays with the two or more types of game apparatuses wins a jackpot award or loses so that the player does not win the jackpot award; a storage unit to store payout amount data indicating a payout target amount to be paid out to the winning player when the drawing unit determines the winning of the jackpot award; a payout processing unit to perform a payout process to read out the payout amount data from the storage unit when the drawing unit determines the winning of the jackpot award, and executing a payout process to pay out a payout target of an amount indicated by the read-out payout amount data to the winning player; a payout amount increasing unit to accumulatively increase the amount indicated by the payout amount data stored in the storage unit when a predetermined payout amount increasing condition is satisfied; and a winning information transmitting unit to transmit winning information indicating the winning to the total performance processing apparatus when the drawing unit determines the winning of the jackpot award, and wherein the control command transmitting unit of the total performance processing apparatus transmits the total performance control command to each of the two or more types of game apparatuses when the winning information is received.

7. The game system according to claim 6, wherein the game progress control unit provided in each of the two or more types of game apparatuses does not perform the game performance control during the total performance control by the total performance control unit or performs the game performance control in which the performance is carried out in moderation.

8. The game system according to claim 1, wherein the game progress control unit provided in each of the two or more types of game apparatuses does not perform the game performance control during the total performance control by the total performance control unit or performs out the game performance control in which the performance is carried out in moderation.

9. The game system according to any one of claims 1 to 4, wherein each of the two or more types of game apparatuses comprises a timing anticipation processing unit to perform a process of anticipating a timing at which game progress at each of the game apparatuses is changed to a previously set situation where the total performance is carried out, and transmitting total performance enabling timing information indicating the anticipated timing to the total performance processing apparatus, and the total performance processing apparatus comprises a total performance timing determining unit to determine the predetermined total performance timing based on the total performance enabling timing information transmitted from the two or more types of game apparatuses.

10. The game system according to any one of claims 1 to 4, wherein the total performance processing apparatus comprises a performance timing determining unit to determine the predetermined total performance timing according to a predetermined total performance timing determining condition, the control command transmitting unit of the total performance processing apparatus transmits the total performance control command to carry out the total performance at the predetermined total performance timing determined by the performance timing determining unit to each of the two or more types of game apparatuses, and the game progress control unit provided in each of the two or more types of game apparatuses performs game progress control so that the game progress situation at each of the game apparatuses is changed to a previously set situation in which the total performance is carried out, at the predetermined total performance timing according to the total performance control command from the total performance processing apparatus.

11. A game apparatus, comprising:

a performance unit to carry out a performance visually or audibly appealing to a player; and a game progress control unit to perform game performance control according to game progress by controlling the game progress and controlling the performance unit, wherein the game apparatus is connected to and communicates with a total performance processing apparatus to transmit to each of two or more types of game apparatuses a total performance control command to carry out a single total performance in all game apparatuses by using the performance unit provided in each of the two or more types of game apparatuses having different hardware configurations from each other, and the game apparatus further comprises a total performance control unit configured to perform total performance control to carry out a performance that is a different part of the total performance at the predetermined total performance timing, such that the total performance is carried out, by controlling the performance unit according to the total performance control command when the total performance control command is received from the total performance processing apparatus.

12. A total performance processing apparatus, connected to and communicating with two or more types of game apparatuses having hardware configurations different from each other, the total performance processing apparatus comprising:

performing a process to carry out a single total performance at all the game apparatuses by using each of performance units, provided in each of the two or more types of game apparatuses, to carry out a performance visually or audibly appealing to a player;

the total performance processing apparatus comprising a control command transmitting unit to transmit a total performance control command to carry out the total performance by causing the performance unit in each of the two or more types of game apparatuses to carry out a performance that is a different part of the total performance at a predetermined total performance timing such that the total performance is carried out, to each of the two or more types of game apparatuses.

* * * * *